(12) United States Patent
Ishii et al.

(10) Patent No.: US 12,593,258 B2
(45) Date of Patent: Mar. 31, 2026

(54) VEHICLE CONTROL SYSTEM

(71) Applicant: Hitachi Construction Machinery Co., Ltd., Tokyo (JP)

(72) Inventors: Hirotake Ishii, Tokyo (JP); Hidefumi Ishimoto, Tokyo (JP); Akiyoshi Kirimura, Tokyo (JP); Yuusuke Eguchi, Tokyo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 299 days.

(21) Appl. No.: 18/279,406

(22) PCT Filed: Jun. 7, 2022

(86) PCT No.: PCT/JP2022/022935
§ 371 (c)(1),
(2) Date: Aug. 30, 2023

(87) PCT Pub. No.: WO2022/260033
PCT Pub. Date: Dec. 15, 2022

(65) Prior Publication Data
US 2024/0163764 A1 May 16, 2024

(30) Foreign Application Priority Data
Jun. 9, 2021 (JP) ................................. 2021-096491

(51) Int. Cl.
*H04W 36/18* (2009.01)
*H04W 36/30* (2009.01)
*H04W 36/32* (2009.01)

(52) U.S. Cl.
CPC ......... *H04W 36/18* (2013.01); *H04W 36/324* (2023.05); *H04W 36/304* (2023.05)

(58) Field of Classification Search
None
See application file for complete search history.

(56) References Cited

U.S. PATENT DOCUMENTS 5,584,049 A * 12/1996 Weaver, Jr. ........... H04W 52/52
455/67.11
6,226,572 B1 5/2001 Tojima et al.
(Continued)

FOREIGN PATENT DOCUMENTS

CA 3 138 462 A1 11/2020
CA 3 138 462 C 2/2024
(Continued)

OTHER PUBLICATIONS

Extended European Search Report issued in European Application No. 22820212.3 dated Mar. 26, 2025 (12 pages).
(Continued)

*Primary Examiner* — Walter J Divito
(74) *Attorney, Agent, or Firm* — Crowell & Moring LLP

(57) ABSTRACT

Provided is a vehicle control system that can prevent delays and losses in packet communication, prevent handover failures, and improve productivity while ensuring safety for various types of vehicles. The vehicle control system includes an on-board terminal mounted on a vehicle and including a plurality of wireless modems; a plurality of wireless base stations that wirelessly communicate with the on-board terminal, and form a plurality of cells; and a vehicle central control device that communicates with the on-board terminal via one of the wireless base stations. Each of the plurality of wireless modems is configured to be able to, when the vehicle moves across the plurality of cells, execute a handover to switch a connection to one of the plurality of wireless base stations to another. Each of the plurality of wireless modems is configured to be able to set threshold for executing the handover different from others.

6 Claims, 14 Drawing Sheets

(56)     References Cited

U.S. PATENT DOCUMENTS

| 2014/0148174 A1 | 5/2014 | Teyeb et al. |
| 2016/0014657 A1 | 1/2016 | Le et al. |
| 2016/0020890 A1* | 1/2016 | Sirotkin ............ H04W 36/0088 |
| | | 370/352 |

FOREIGN PATENT DOCUMENTS

| JP | 10-222227 A | 8/1998 |
| JP | 2017-72946 A | 4/2017 |

OTHER PUBLICATIONS

International Search Report (PCT/ISA/210) issued in PCT Application No. PCT/JP2022/022935 dated Aug. 23, 2022 with English translation (4 pages).
Japanese-language Written Opinion (PCT/ISA/237) issued in PCT Application No. PCT/JP2022/022935 dated Aug. 23, 2022 with English translation (6 pages).

* cited by examiner

Figure 11:
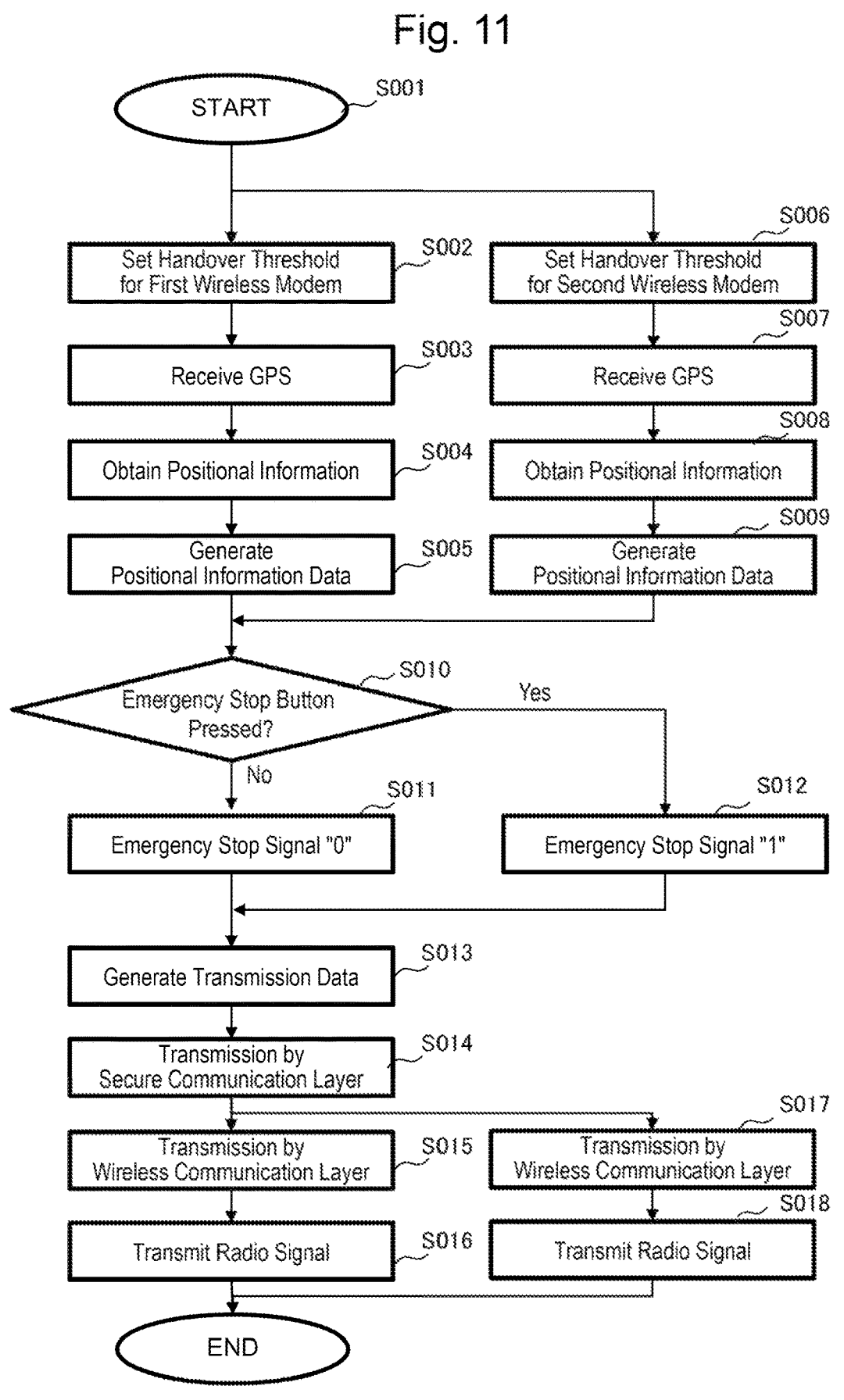

START — S001

Set Handover Threshold for First Wireless Modem — S002

Set Handover Threshold for Second Wireless Modem — S006

Receive GPS — S003

Receive GPS — S007

Obtain Positional Information — S004

Obtain Positional Information — S008

Generate Positional Information Data — S005

Generate Positional Information Data — S009

Emergency Stop Button Pressed? — S010

Yes

No

Emergency Stop Signal "0" — S011

Emergency Stop Signal "1" — S012

Generate Transmission Data — S013

Transmission by Secure Communication Layer — S014

Transmission by Wireless Communication Layer — S015

Transmission by Wireless Communication Layer — S017

Transmit Radio Signal — S016

Transmit Radio Signal — S018

END

VEHICLE CONTROL SYSTEM

TECHNICAL FIELD

The present invention relates to a vehicle control system. 5

BACKGROUND ART

There is increasing demand for various types of vehicles that can travel autonomously at mine sites, for example, from the perspectives of lowering labor costs and improving safety. In response to such demand, a vehicle control system is known that allows a vehicle to travel autonomously without an onboard driver in response to an instruction from a control server, for example.

For example, Patent Literature 1 discloses a technique for, when an emergency stop input device is operated, transmitting emergency stop signals to all vehicles traveling within a mine site. In addition, Patent Literature 2 discloses a technique for causing a plurality of vehicles to transmit their own positional data so as to monitor the mutual positional relationships between the vehicles, and when two vehicles have closely approached each other, avoiding the mutual interference of the vehicles by decelerating or stopping one of the vehicles.

To cover the entire region of a large mine site, it is necessary to build a wireless network including a plurality of wireless base stations in the mine site. Each of the plurality of wireless base stations forms one or more wireless areas called "cells." Setting a plurality of cells can build a wireless network covering the entire region of the mine site. When a vehicle moves across the boundary between the plurality of cells, a process called "handover" is executed. The handover is a process of, when the vehicle moves from a first cell to a second cell, switching a wireless base station as a communications partner of the vehicle from a first wireless base station that forms the first cell to a second wireless base station that forms the second cell.

When a handover is performed, quite a large number of signals are transferred between an on-board terminal mounted on a vehicle and a handover-source wireless base station, and between the on-board terminal and a handover-destination wireless base station. Therefore, during the handover process, a delay or a packet loss may occur in the packet communication between the wireless base station and the on-board terminal. In the worst case, the handover process fails, with the result that the process should be executed again, starting with the initial connection in some cases.

In a vehicle control system, the duration of a delay or a loss that occurs in packet communication during a handover process is regarded as a "disruption time." As the disruption time is longer, it is necessary to decelerate or emergently stop the vehicle to ensure safety. To increase work efficiency at a mine site, it is necessary to minimize a delay time in a handover process, and also prevent delays and losses in packet communication, and further prevent handover failures. The techniques disclosed in Patent Literature 1 and Patent Literature 2 fail to provide a method of addressing such problems.

CITATION LIST

Patent Literature

Patent Literature 1: JP 2017-72946 A
Patent Literature 2: JP H10-222227 A

SUMMARY OF INVENTION

Technical Problem

The present invention has been made in view of the foregoing problems, and provides a vehicle control system that can prevent delays and losses in packet communication, prevent handover failures, and improve productivity while ensuring safety for various types of vehicles.

Solution to Problem

A vehicle control system according to the present invention includes an on-board terminal mounted on a vehicle, the on-board terminal including a plurality of wireless modems; a plurality of wireless base stations that wirelessly communicate with the on-board terminal, and form a plurality of cells: and a vehicle central control device that communicates with the on-board terminal via one of the wireless base stations. Each of the plurality of wireless modems is configured to be able to, when the vehicle moves across the plurality of cells, execute a handover to switch a connection to one of the plurality of wireless base stations to another. Each of the plurality of wireless modems is configured to be able to set threshold for executing the handover different from the others.

Advantageous Effects of Invention

According to a vehicle control system of the present invention, the vehicle control system can be provided that can prevent delays and losses in packet communication, prevent handover failures, and improve productivity while ensuring safety for various types of vehicles.

BRIEF DESCRIPTION OF DRAWINGS

FIG. 5 is a schematic view illustrating a state in which an unmanned dump truck 10-1 is traveling along a travel path 100, and the received power of a radio signal transmitted from a wireless base station 4-1 and the received power of a radio signal transmitted from a wireless base station 4-2 gradually change.

FIG. 11 is a flowchart specifically illustrating the transmission operation of the on-board terminal 2 of the first embodiment.

DESCRIPTION OF EMBODIMENTS

Figure 1:
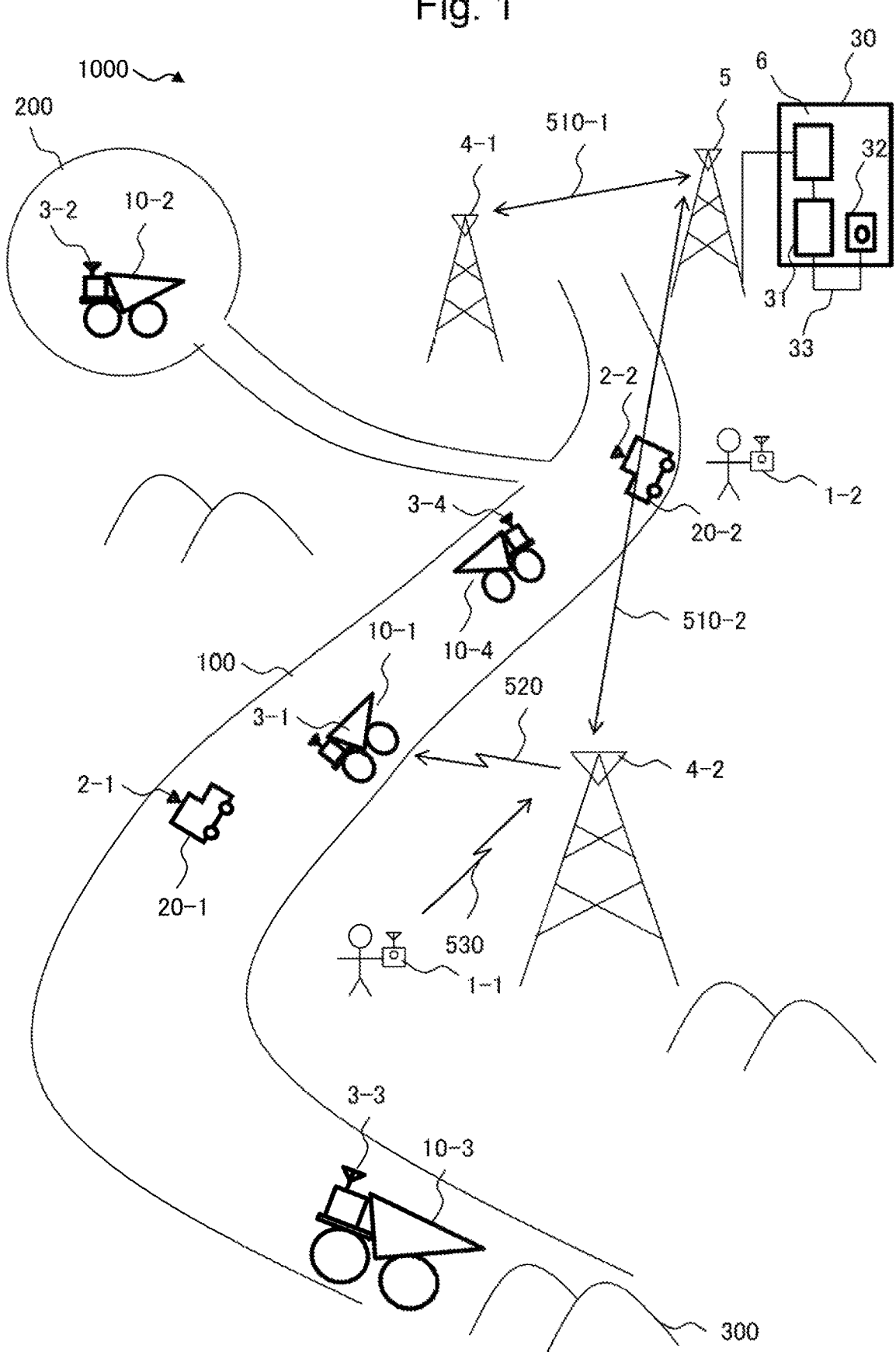
FIG. 1 is a schematic view illustrating an exemplary overall configuration of a vehicle control system 1000 according to a first embodiment.

Hereinafter, the present embodiment will be described with reference to the accompanying drawings. Throughout the accompanying drawings, components with the same functions may be denoted by the same reference numerals. Although the accompanying drawings illustrate embodiments and implementations based on the principle of the present disclosure, such embodiments and implementations should be used only to understand the present disclosure, and should not be used to narrowly construe the present disclosure. The description of this specification only illustrates typical examples, and shall not limit the claims or examples of the application of the present disclosure by any means.

Although the present embodiment will be described in full detail for one of ordinary skill in the art to carry out the present disclosure, it should be understood that other implementations and forms are also possible, and thus, any changes to the configuration and structure of the present disclosure as well as replacement of various components is possible within the scope and spirit of the technical idea of the present disclosure. Thus, the present disclosure should not be narrowly construed based on the following description.

First Embodiment

Hereinafter, a vehicle control system according to a first embodiment will be described in detail with reference to the drawings. FIG. 1 is a schematic view illustrating an exemplary overall configuration of a vehicle control system 1000 according to the first embodiment. The vehicle control system 1000 also functions as an emergency stop system for stopping an autonomous vehicle in an emergency.

In FIG. 1, the vehicle control system 1000 includes portable terminals 1-1 to 1-2, on-board terminals 2-1 to 2-2, on-board terminals 3-1 to 3-4, wireless base stations 4-1 to 4-2, a control tower 5, autonomous vehicles (hereinafter referred to as "unmanned dump trucks") 10-1 to 10-4, manned vehicles 20-1 to 20-2 designed for manned driving, and a control center 30. The vehicle control system 1000 is configured to be able to control the travel, emergency deceleration, and emergency stop, for example, of the unmanned dump trucks 10-1 to 10-4 and the manned vehicles 20-1 to 20-2.

The vehicle control system 1000 is provided in a mine, for example. Each of the unmanned dump trucks 10-1 to 10-4 is a vehicle that can travel autonomously without an onboard driver, and thus is operated without a driver sitting therein in principle, and is controlled based on the vehicle control system 1000. The unmanned dump trucks 10-1 to 10-4 are transporter vehicles for loading and transporting a load, such as earth, sand, or ores, for example. Each unmanned dump truck 10 travels autonomously without an onboard driver along & travel path 100 set in advance within the mine site. For example, a shovel (not illustrated) for performing an operation of loading earth, sand, or ores on the unmanned dump truck 10 is provided at a loading site 200. Thus, the unmanned dump truck 10 travels back and forth between the loading site 200 and a dumping site 300 along the travel path 100 so as to transport the load. The control center 30 has a vehicle central control device 31 and an emergency stop input device 32 arranged therein.

Note that the number of devices of each type is not limited to that illustrated in the drawings or to a specific number. For example, there may be one or more on-board terminals and one or more unmanned dump trucks. Likewise, there may be one or more on-board terminals and one or more manned vehicles.

Though not illustrated in FIG. 1, a system for supporting autonomous drive of the unmanned dump trucks 10-1 to 10-4, and a travel management system are provided at a work site in the mine.

The portable terminals 1-1 and 1-2 may have either the same configuration or different configurations. Hereinafter, the portable terminals 1-1 and 1-2 may be collectively referred to as "portable terminals 1" without distinction. Similarly, the on-board terminals 2-1 and 2-2, the on-board terminals 3-1 to 3-4, and the wireless base stations 4-1 to 4-2 may be respectively collectively referred to as "on-board terminals 2," "on-board terminals 3," and "wireless base stations 4" without distinction. In addition, the unmanned dump trucks 10-1 to 10-4 may all have the same configuration, and thus may be collectively referred to as "unmanned dump trucks 10." The manned vehicles 20-1 and 20-2 may also be collectively referred to as "manned vehicles 20."

Note that in the present embodiment, the control targets of the vehicle control system 1000 are the unmanned dump trucks 10, but autonomous vehicles that are the control targets of the vehicle control system 1000 are not limited to the unmanned dump trucks, and the manned dump trucks 20 may also be the control targets. In such a case, the manned dump trucks 20 may be controlled in a similar manner to the unmanned dump trucks 10.

In the mine site, the manned vehicles 20 also travel besides the unmanned dump trucks 10 that transport a load, such as earth, sand, or ores. Each manned vehicle 20 is a vehicle configured to have its driver or other passengers sitting therein, and configured to be driven/operated by the driver. Examples of the manned vehicle 20 include the foregoing shovel, a dozer that levels the road surface of the travel path 100, a motor sprinkler, and a service car that patrols the area in the mine site.

Each portable terminal 1 is a portable device that can be carried by an operator in the mine site. The portable terminal 1 also has a function of an emergency stop device that transmits an emergency stop command signal for emergently stopping the unmanned dump truck 10 in an emergency.

Each on-board terminal 2 is an on-board device mounted on the manned vehicle 20. The on-board terminal 2 also has a function of an emergency stop device that transmits an emergency stop command signal. Thus, the driver or the passenger of the manned vehicle 20 is able to issue a command to emergently stop the unmanned dump truck 10 using the on-board terminal 2 in an emergency. This ensures safety. The emergency stop command signal can be transmitted from the travel path 100, the loading site 200, or the dumping site 300, for example, in the mine site.

Note that in the present embodiment, the range of the term "emergency" is not limited to a specific range. Thus, the operator or the driver of the manned vehicle 20, for example, is able to determine whether the unmanned dump truck 10 is in an emergency situation by himself/herself, and thus issue an emergency stop command. Typically, whether the unmanned dump truck 10 is in an "emergency" situation is determined based on, as a determination criterion, whether the unmanned dump truck 10 needs to be stopped. For example, when there is a possibility that two unmanned dump trucks 10 may collide with each other or the unmanned dump truck 10 and the manned vehicle 20 may collide with each other, it is possible to determine that that the unmanned dump truck(s) 10 (and the manned vehicle 20) are in an "emergency" situation. In addition, when there is a possibility that an operator and the unmanned dump truck 10 may collide with each other, it is also possible to determine that the operator and the unmanned dump truck 10 are in an "emergency" situation.

Each on-board terminal 3 is a wireless receiving device mounted on the unmanned dump truck 10. The on-board terminal 3 can receive a signal transmitted from the portable terminal 1 or the on-board terminal 2. Such a signal includes an emergency stop command signal for stopping the unmanned dump truck 10.

The on-board terminal 3 can also receive an emergency stop command signal from the portable terminal 1 or the on-board terminal 2 via the wireless base station 4, but may also be configured to be able to receive an emergency stop command signal directly from the portable terminal 1 or the on-board terminal 2.

When the on-board terminal 3 has received an emergency stop command signal, the unmanned dump truck 10 stops traveling in response to the signal. The position of an antenna of the on-board terminal 3 mounted on the unmanned dump truck 10 is not limited to a particular position. For example, the antenna can be provided in a place where it can easily receive radio waves, for example, on the front part of the upper face of the unmanned dump truck 10.

The plurality of wireless base stations 4 respectively form cells so that the unmanned dump trucks 10 and the manned vehicles 20 located within the cells can perform wireless communication. For example, since the unmanned dump trucks 10 and the manned vehicles 20 move across a region that includes the travel path 100, the loading site 200, and the dumping site 300, for example, the plurality of wireless base stations 4 are arranged to allow cells formed thereby to include such a region, and thus allow the unmanned dump trucks 10 and the manned vehicles 20 to perform wireless communication.

Each of the plurality of wireless base stations 4 is connected to the vehicle central control device 31 via a core station 6 in the control center 30 by way of the control tower 5 using a wireless backhaul 510. An emergency stop command signal transmitted from the portable terminal 1 or the on-board terminal 2 reaches the vehicle central control device 31 via the core station 6 by way of each wireless base station 4, the wireless backhaul 510, and the control tower 5. The vehicle central control device 31 transmits an autonomous travel control signal to each unmanned dump truck 10 to allow the unmanned dump truck 10 to travel autonomously. In addition, the vehicle central control device 31 has a function of distributing an emergency stop command signal, which has been transmitted from the portable terminal 1 or the on-board terminal 2, to the on-board terminals 3 mounted on all of the unmanned dump trucks 10 by way of the core station 6, the control tower 5, the wireless backhaul 510, and each wireless base station 4.

Note that the vehicle central control device 31 is mounted in a typical server system or computer, and is not characteristic of the present invention. Thus, the detailed description of the vehicle central control device 31 is omitted herein.

When an emergency stop command signal is issued to all of the unmanned dump trucks 10 within the mine site from any one of the portable terminals 1 or the on-board terminals 2, it is possible to stop not only the unmanned dump truck 10 that actually needs to be stopped but also all of the unmanned dump trucks 10 and/or the manned vehicles 20.

In the control center 30, the emergency stop input device 32 is arranged in addition to the core station 6 and the vehicle central control device 31. The vehicle central control device 31 and the emergency stop input device 32 are connected together in a communicable manner via a wired line 33. The emergency stop input device 32 is a device that issues an emergency stop command in response to an operator's operation in the control center 30. Thus, the operator in the control center 30 is able to issue an emergency stop command to all of the unmanned dump trucks 10 and/or the manned vehicles 20 by directly transmitting an emergency stop command signal to the vehicle central control device 31 using the emergency stop input device 32. Although the foregoing description illustrates an example in which the emergency stop input device 32 is connected to the vehicle central control device 31, the emergency stop input device 32 may be wirelessly connected to not the vehicle central control device 31 but the wireless base station 4.

Each of the on-board terminals 2 and the on-board terminals 3-1 to 3-4 has a GPS receiver function mounted thereon. With the GPS receiver function, each of the manned vehicles 20 and the unmanned dump trucks 10) can obtain its own positional information.

The on-board terminal 2 mounted on each manned vehicle 20 has a function of transmitting its own positional information. The on-board terminal 3 mounted on each unmanned dump truck 10 can also determine the distance between the unmanned dump truck 10 and each manned vehicle 20 using the positional information on each manned vehicle 20 transmitted from the manned vehicle 20, and the positional information on the unmanned dump truck 10 obtained with the GPS receiver function mounted on the unmanned dump truck 10. Needless to say, a method other than the method using the GPS may be used as the method for obtaining the own positional information.

Next, a configuration example of the on-board terminal 2 will be described with reference to a block diagram in FIG. 2. The on-board terminal 2 includes a first wireless transmission/reception antenna 101-1, a second transmission/reception antenna 101-2, a first wireless modem 102-1, a second wireless modem 102-2, a microcomputer device 103, an external interface (I/F) 104, a power supply device 105, a display device 106, an emergency stop button 107, a GPS receiver 108, and a GPS antenna 109, for example.

The on-board terminal 2 includes a plurality of wireless modems, for example, two wireless modems 102-1 and 102-2. Each of the first wireless modem 102-1 and the second wireless modem 102-2 includes a high-frequency circuit and an integrated circuit, for example. The first wireless modem 102-1 and the second wireless modem 102-2 are respectively connected to the first wireless transmission/reception antenna 101-1 and the second transmission/reception antenna 101-2, and wirelessly communicate with the wireless base station 4 using a predetermined wireless communication scheme (e.g., LTE or WiFi). The first wireless modem 102-1 and the second wireless modem 102-2 are also connected to the microcomputer device 103, and transmit the received signals to the microcomputer device 103. Specifically, radio signals 110-1 and 110-2, which have been transmitted from the wireless base station 4 and respectively received by the first wireless transmission/reception antenna 101-1 and the second transmission/reception antenna 101-2, are input to the first wireless modem 102-1 and the second wireless modem 102-2, and are subjected to predetermined filtering, amplification, frequency conversion, demodulation, and error correction decoding, and are then output to the microcomputer device 103 as reception data 112-1 and 112-2.

In addition, the wireless modems 102-1 and 102-2 respectively perform processes, such as error correction coding, modulation, frequency conversion, amplification, and filtering, on the transmission data 111-1 and 111-2 output from the microcomputer device 103, thereby generating radio signals 110-1 and 110-2, and then output the radio signals to the respective transmission/reception antennas 101.

The microcomputer device 103 includes a CPU 801 (i.e., an arithmetic processing unit) and a storage device 802 (e.g., a main memory or a flash memory), and is connected to the first wireless modem 102-1, the second wireless modem 102-2, the external I/F 104, the power supply device 105, the display device 106, the emergency stop button 107, and the GPS receiver 108. As programs stored in the storage device 802 are executed by the CPU 801, functions described below are implemented. The microcomputer device 103 is configured to preferentially receive, of the received data from the first wireless modem 102-1 and the received data from the second wireless modem 102-2, data that has arrived earlier, and discard data that has arrived later.

Note that the microcomputer device 103 may be partially or entirely configured with an integrated circuit, for example. The microcomputer device 103 determines if a communication disruption related to functional security has occurred, and also determines if the power supply device 105 is operating normally. Note that a microcomputer suited to provide functional security is desirably used as the microcomputer device 103. For example, a microcomputer that satisfies a safety standard, such as SIL (Safety Integrity Level), is preferably used. The external I/F 104 includes a voltage conversion unit, a protocol conversion unit, and a connector, for example, and functions as an interface with an external device. Specifically, the external I/F 104 is configured to be able to convert a voltage and a protocol into those necessary for an external device. For example, the external I/F 104 can function as an interface with a BCU (Brake Control Unit) mounted on the unmanned dump truck 10, for example.

The power supply device 105 includes a battery 810 and a voltage converter 811, for example. The power supply device 105 has a function of converting power supplied from the battery 810 into a necessary voltage with the voltage converter 811, and then supplying the voltage to each unit in the on-board terminal 3.

The display device 106 includes LEDs or a liquid crystal display device, for example, and is connected to the microcomputer device 103. The display device 106 has a function of informing an operator or a maintainer if a normal power supply is available and of the results of determination of if a wireless communication disruption has occurred.

The emergency stop button 107 is connected to the microcomputer device 103, and includes an operation button for an operator to issue an emergency stop command to the unmanned dump truck 10. The emergency stop button 107 is adapted to issue an emergency stop command to the unmanned dump truck 10 as with the emergency stop input device 32 in the control center 30, but the emergency stop button 107 is provided in the on-board terminal 2. The emergency stop button 107 may have a push button structure that detects a command from an operator when the button is pressed by the operator. In addition, the emergency stop button 107 may have a mechanism of being locked when pressed, and maintaining the pressed state until it is unlocked.

The GPS receiver 108 is connected to the GPS antenna 109 and the microcomputer device 103, and obtains positional information representing the current position of the manned vehicle 20 from a GPS reception signal received via the GPS antenna 109. The GPS receiver 108 periodically (e.g., once every second) outputs the positional information representing the current position of the manned vehicle 20 to the microcomputer device 103.

Next, a configuration example of the on-board terminal 3 will be described with reference to FIG. 3. The on-board terminal 3 includes a first wireless transmission/reception antenna 101-1, a second transmission/reception antenna 101-2, a first wireless modem 102-1, a second wireless modem 102-2, a microcomputer device 103, an external i/F (interface) device 104, a power supply device 105, a display device 106, a GPS receiver 108, and a GPS antenna 109, for example. That is, the on-board terminal 3 may have the same configuration as the on-board terminal 2 except that the emergency stop button 107 is not provided.

Figure 4:
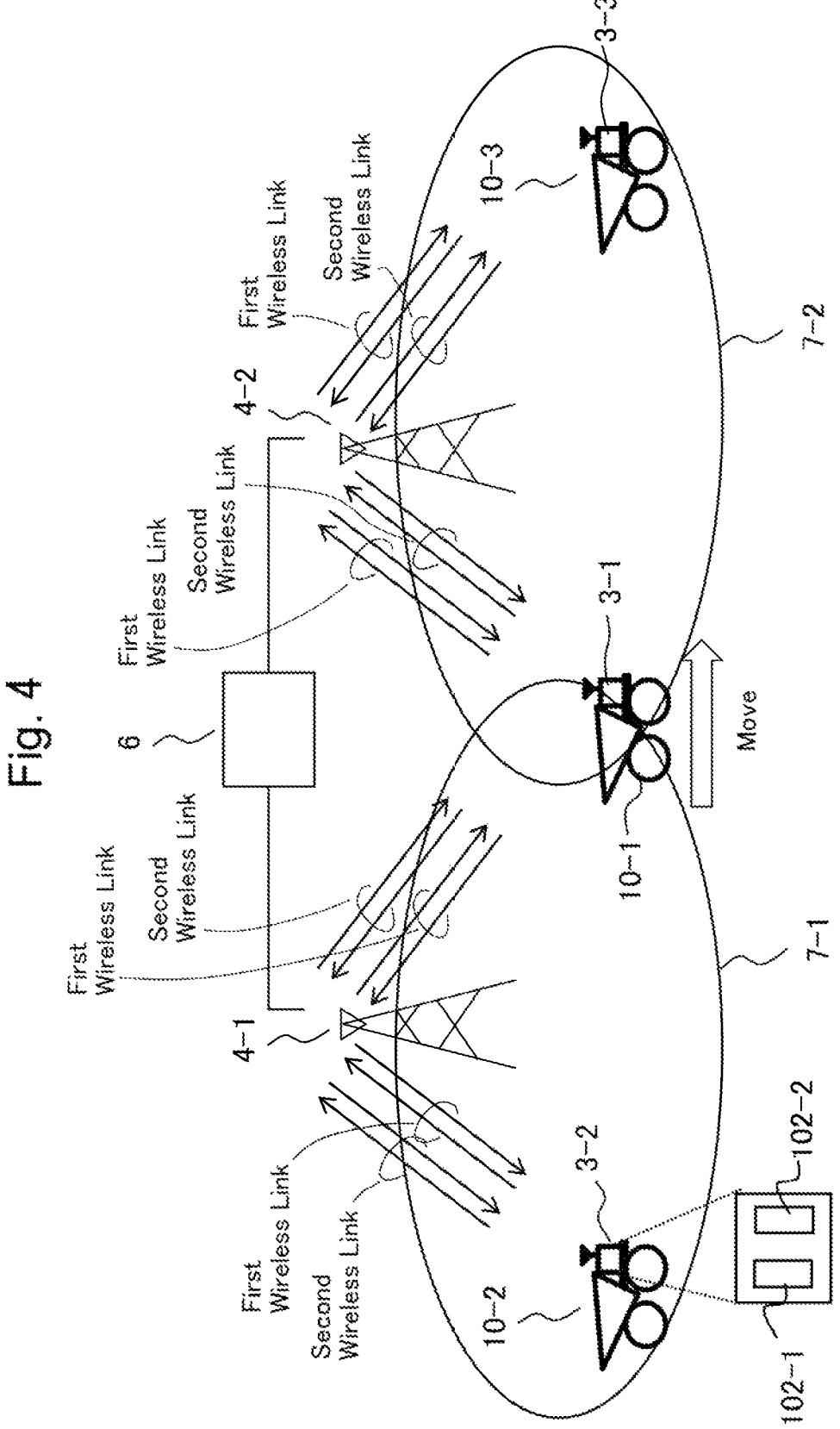
FIG. 4 is a schematic view illustrating the operation of the vehicle control system 1000 according to the first embodiment.

FIG. 4 is a schematic view illustrating a wireless connection state related to the unmanned dump trucks 10 (10-1 to 10-3), the on-board terminals 3 (3-1 to 3-3), and the wireless base stations 4 (4-1 and 4-2) in the vehicle control system 1000 according to the first embodiment. Although a wireless connection of the unmanned dump trucks 10 is described herein, the manned vehicles 20 can also be wirelessly connected in a similar manner. To cover the entire region of a large mine site, the vehicle control system 1000 forms a plurality of wireless base stations 4 and a plurality of cells 7. Herein, two wireless base stations 4 (4-1 and 4-2) and two cells 7 (7-1 and 7-2) are illustrated, for example.

Each of the plurality of wireless base stations 4 forms one or more cells 7 as a wireless communication area(s). Herein, each of the two wireless base stations 4-1 and 4-2 forms a single cell 7 (7-1 or 7-2), and the entire region of the mine is covered by the two cells 7-1 and 7-2. When the unmanned dump truck 10 and/or the manned vehicle 20 move(s) across the boundary between the cells 7-1 and 7-2, a process called handover is performed. The following will mainly describe a handover of the unmanned dump truck 10, but the description is also applicable to a handover of the manned vehicle 20.

In a handover process, quite a large number of communication messages are transferred between the on-board terminal 3 mounted on the unmanned dump truck 10 and the handover-source wireless base station 4, and between the on-board terminal 3 and the handover-destination wireless base station 4 via the core station 6. During the handover process, a delay or a loss may occur in the packet communication between the wireless base station 4 and the on-board terminal 3. In the worst case, the handover process fails, with the result that the process should be executed again, starting with the initial connection in some cases. That is, when the unmanned dump truck 10 moves across the boundary between the plurality of cells 7, a handover process is performed, but a delay or a loss occurs in the packet communication during the process. Since the duration of the delay or the loss that occurs in the packet communication is regarded as a "disruption time," it is necessary to decelerate or emergently stop the vehicle to ensure safety when a given disruption time has elapsed. Thus, it is necessary to minimize a delay time in a handover process, and also prevent delays and losses in packet communication, and further prevent handover failures.

The operation of the vehicle control system 1000 according to the first embodiment will be specifically described with reference to FIG. 4. Each of the on-board terminals 3 (3-1 to 3-3) mounted on the respective unmanned dump trucks 10 includes a plurality of (e.g., two) wireless modems 102-1 and 102-2 to perform high-speed communication and improve reliability. The two modems communicate with the wireless base station 4 using a first wireless link and a second wireless link, respectively.

For example, suppose that the unmanned dump truck 10-1 is traveling from the cell 7-1 formed by the wireless base station 4-1 toward the cell 7-2 formed by the wireless base station 4-2. Then, the received power of radio waves transmitted from the wireless base station 4-1 and received via the first and second wireless links gradually decreases. In contrast, the received power of radio waves transmitted from the wireless base station 4-2 and received via the first and second wireless links gradually increases.

Figure 5:
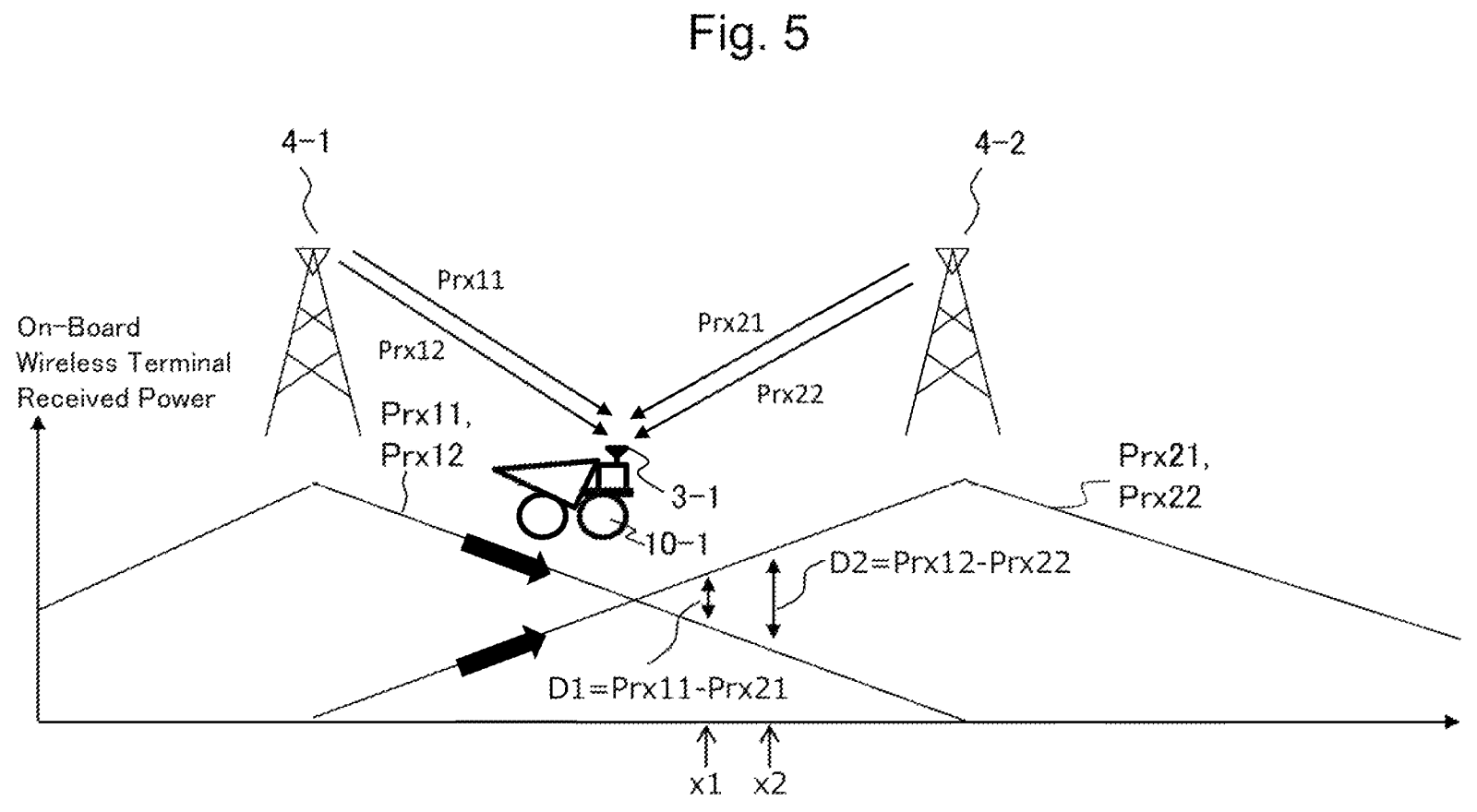

Described below with reference to FIG. 5 is a view in which the unmanned dump truck 10-1 is traveling along the travel path 100, and the received power of a radio signal transmitted from the wireless base station 4-1 and the received power of a radio signal transmitted from the wireless base station 4-2 gradually change. The ordinate axis of the graph in FIG. 5 represents the received power of a radio signal transmitted from each wireless base station 4, and the abscissa axis represents a position on the travel path (a distance x from a predetermined point). Note that in FIG. 5, the received power of a radio signal transmitted from the wireless base station 4-1 and received by the first wireless modem 102-1 is indicated by Prx11, the received power of a radio signal transmitted from the wireless base station 4-1 and received by the second wireless modem 102-2 is indicated by Prx12, the received power of a radio signal transmitted from the wireless base station 4-2 and received by the first wireless modem 102-1 is indicated by Prx21, and the received power of a radio signal transmitted from the wireless base station 4-2 and received by the second wireless modem 102-2 is indicated by Prx22.

Herein, suppose that the unmanned dump truck 10-1 travels along the travel path from the cell 7-1 formed by the wireless base station 4-1 toward the cell 7-2 formed by the wireless base station 4-2, and reaches a region around the boundary between the cells 7-1 and 7-2. In such a case, the received powers Prx11 and Prx12 of the radio signals transmitted from the wireless base station 4-1 gradually decrease, whereas the received powers Prx21 and Prx22 of the radio signals transmitted from the wireless base station 4-2 gradually increase. The on-board terminal 3-1 mounted on the unmanned dump truck 10-1 performs a handover to switch its connection to the wireless base station 4-1 to a connection to the wireless base station 4-2 at an appropriate timing so as to maintain the communication.

Several handover methods are considered. Herein, the handover start timing is controlled by determining the difference between the received power of the radio signal from the handover-source wireless base station 4-1 and the received power of the radio signal from the handover-destination wireless base station 4-2, and comparing the determined difference with a threshold. Herein, the handover-source wireless base station 4-1 refers to a wireless base station with which a connection has been established previously and the connection is to be terminated upon completion of a handover, while the handover-destination wireless base station 4-2 refers to a wireless base station with which a new connection is to be established through a handover process. In the case of LTE, the threshold can also serve as a threshold for starting the transmission of a measurement report message, which also serves as a trigger to start a handover process.

The on-board terminal 3 of the present embodiment includes a plurality of (e.g., two) wireless modems 102-1 and 102-2, and thresholds Thr1 and Thr2, which are used to determine whether to start a handover, are set to different values in the plurality of the wireless modems 102-1 and 102-2, respectively. For example, the threshold Thr1 for determining whether to start a handover with the first wireless modem 102-1 can be set to 3 dB, and the threshold Thr2 for determining whether to start a handover with the second wireless modem 102-2 can be set to 6 dB.

Specifically, when a difference signal D1(=Prx11−Prx12) between the received power Prx11 of the radio signal transmitted from the wireless base station 4-1 and received by the first wireless modem 102-1 and the received power Prx21 of the radio signal transmitted from the wireless base station 4-2 and received by the first wireless modem 102-1 has reached the threshold Thr1 (3 dB), the first wireless modem 102-1 starts a handover process to switch the target wireless base station from the wireless base station 4-1 to the wireless base station 4-2.

When a difference signal D2 (=Prx12−Prx22) between the received power Prx12 of the radio signal transmitted from the wireless base station 4-1 and received by the second wireless modem 102-2 and the received power Prx22 of the radio signal transmitted from the wireless base station 4-2 and received by the second wireless modem 102-2 has reached the threshold Thr2 (6 dB), the second wireless modem 102-2 starts a handover process to switch the target wireless base station from the wireless base station 4-1 to the wireless base station 4-2.

The second wireless modem 102-2 uses, as the threshold Thr2 for starting a handover, a threshold that is greater than the threshold Thr1 for starting a handover used by the first wireless modem 102-1. Therefore, in a circumstance like the one in FIG. 5, the second wireless modem 102-2 starts a handover process after the first wireless modem 102-1 has started a handover process.

Figure 6:
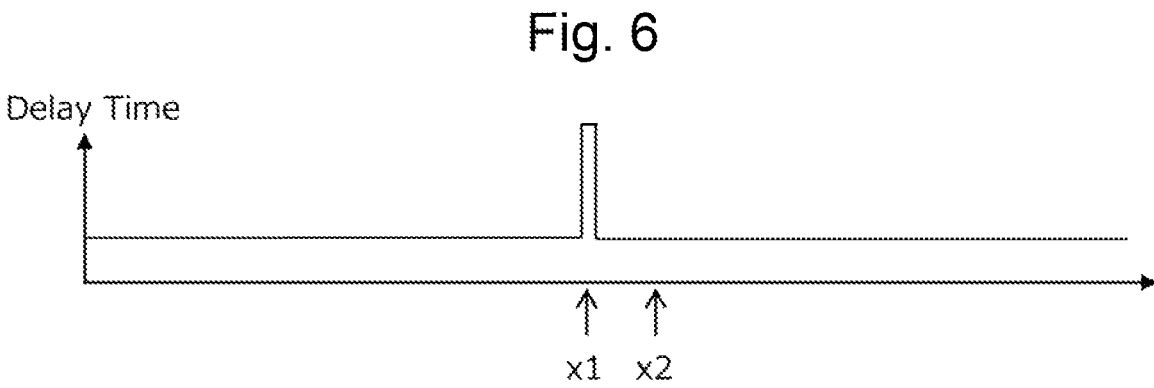
FIG. 6 is a graph illustrating a view in which a delay time occurs in packet communication of a first wireless modem 102-1 when the operation in FIG. 5 is performed.
Figure 7:
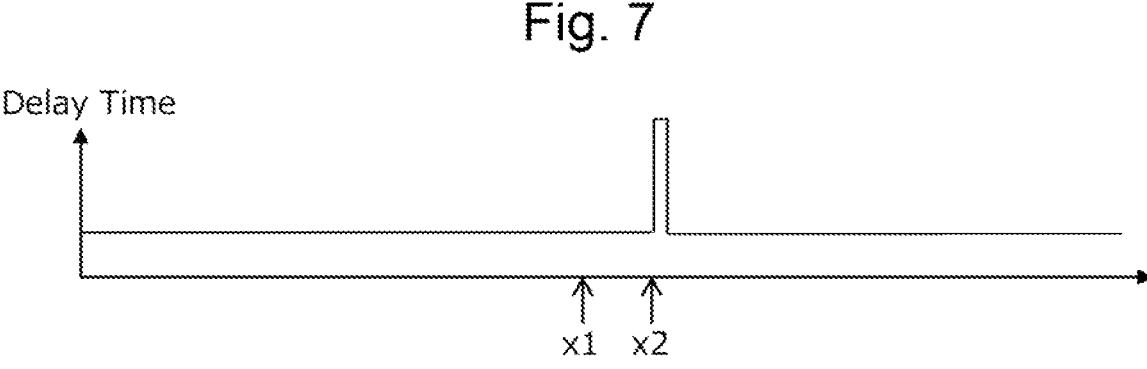
FIG. 7 is a graph illustrating a view in which a delay time occurs in packet communication of a second wireless modem 102-2 when the operation in FIG. 5 is performed.
Figure 8:
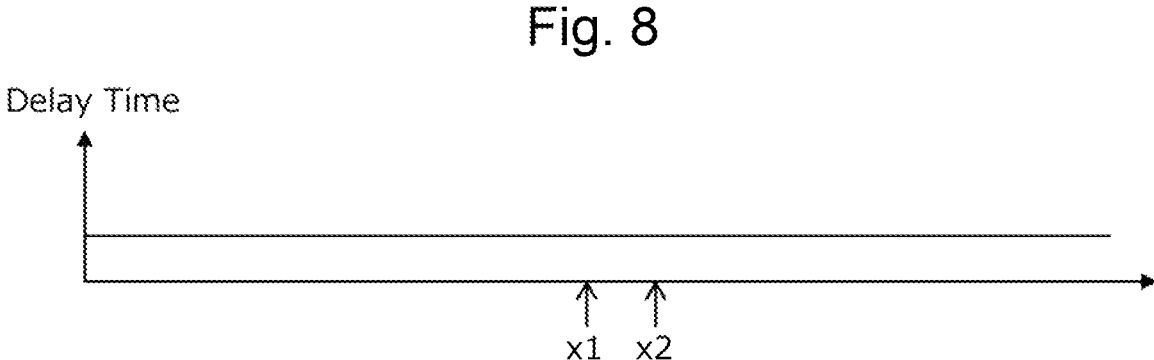
FIG. 8 is a graph illustrating a view in which a delay time occurs in packet communication of the on-board terminal 3 when the operation in FIG. 5 is performed.

Described below with reference to FIGS. 6 to 8 are a view in which a delay time occurs in the packet communication of the first wireless modem 102-1 (FIG. 6), a view in which a delay time occurs in the packet communication of the second wireless modem 102-2 (FIG. 7), and a view in which a delay time occurs in the entire on-board terminal 3 (FIG. 8) when the operation in FIG. 5 is performed. In the graphs of FIGS. 6 to 8, the abscissa axis represents a position (x) along the travel path, and the ordinate axis represents the delay time in the packet communication that occurs in each device.

For example, when the unmanned dump truck 10-1 has reached a position x1, and the difference signal D1=Prx11−Prx21 has reached the threshold Thr1, the first wireless modem 102-1 starts a handover process. At this time, quite a large number of communication messages are transferred between the handover-source wireless base station 4-1 and the handover-destination wireless base station 4-2 via the core station 6 besides the communication performed between the first wireless modem 102-1 of the on-board terminal 3-1 and the wireless base station 4-1 or the wireless base station 4-2. For example, a large number of communication messages are transferred between the wireless base stations 4-1 and 4-2 to transfer the terminal information on the on-board terminal 3-1, which is held in the handover-source wireless base station 4-1, to the handover-destination wireless base station 4-2. In addition, a communication message for checking if the handover-destination wireless base station 4-2 has a capacity enough to accept the on-board terminal 3-1 is also transferred.

As illustrated in FIG. 6, while the first wireless modem 102-1 is executing a handover process, a delay time in the packet communication between the wireless base station 4-1 or the wireless base station 4-2 and the first wireless modem 102-1 is large at the bandover position x1 of the first wireless modem 102-1. During the handover process, not only a delay in the packet communication, but also a packet loss may occur. In the worst case, the handover process fails, with the result that the process should be executed again, starting with the initial connection in some cases.

Meanwhile, when the unmanned dump truck 10-1 has reached a position x2, and the difference signal D2=Prx21−Prx22 has reached the threshold Thr2, the second wireless modem 102-2 starts a handover process. At this time, as in the second wireless modem 102-1, quite a large number of communication messages are transferred between the handover-source wireless base station 4-1 and the handover-destination wireless base station 4-2 via the core station 6 besides the communication performed between the second wireless modem 102-2 of the on-board terminal 3-1 and the wireless base station 4-1 or the wireless base station 4-2.

As illustrated in FIG. 7, while the second wireless modem 102-2 is executing a handover process, a delay time in the packet communication between the wireless base station 4-1 or the wireless base station 4-2 and the second wireless modem 102-2 is large at the bandover position x2 of the second wireless modem 102-2. During the handover process, not only a delay in the packet communication, but also a packet loss may occur. In the worst case, the handover process fails, with the result that the process should be executed again, starting with the initial connection in some cases.

However, as described above, the microcomputer device 103 in the on-board terminal 3-1 has a function of preferentially receiving, of the received packet of the first wireless modem 102-1 and the received packet of the second wireless modem 102-2, a packet that has arrived earlier, and discarding a packet that has arrived later. Therefore, as illustrated in FIG. 8, a packet that has reached the second wireless modem 102-2 or the first wireless modem 102-1 earlier is selected as the received packet at each of the handover position x1 of the first wireless modem 102-1 and the handover position x2 of the second wireless modem 102-2. Therefore, even when a delay time has occurred in the first wireless modem 102-1 and/or the second wireless modem 102-2 at the position x1 and/or the position x2, a delay does not occur as a whole in the packet communication of the on-board terminal 3-1. Thus, it is possible to operate various types of vehicles without emergently decelerating or emergently stopping them, and improve the productivity of the mine while ensuring safety. In addition, similar advantageous effects are also obtained when a packet loss or a handover failure has occurred in the wireless modem(s).

The delay time illustrated in each of FIGS. 6 to 8 is only an example to help understand the present embodiment. In practice, variation occurs, for example, but such variation does not reverse the advantageous effects of the present embodiment. Though not described, the on-board terminal 3 similarly includes a plurality of wireless modems 102-1 and 102-2 that are similarly provided with different handover thresholds, and thus can execute an operation similar to that described above.

Figure 9:
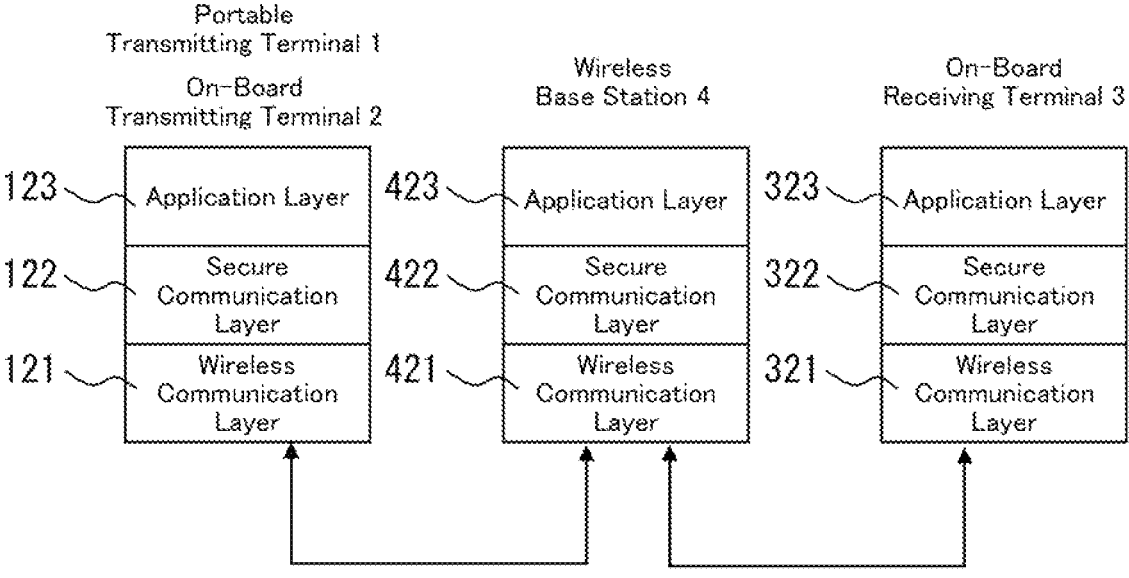
FIG. 9 is a schematic view illustrating a communication protocol stack used in the vehicle control system 1000.

A communication protocol stack used in the vehicle control system 1000 will be described with reference to FIG. 9. FIG. 9 is a view illustrating an example of a communication protocol stack for each of the portable terminal 1, the on-board terminal 2, the on-board terminal 3, and the wireless base station 4.

A protocol stack including three communication layers is used in a communication link for the vehicle control system 1000 according to the first embodiment. For example, the portable terminal 1, the on-board terminal 2, the on-board terminal 3, and the wireless base station 4 mutually transmit or receive data including a protocol stack of a wireless communication layer (i.e., a first wireless communication layer), a secure communication layer (i.e., a second communication layer), and an application layer (i.e., a third communication layer).

The wireless communication layer is a layer that is defined by a communication profile intended to establish a wireless communication connection and maintain the communication, and controls a wireless communication function based on the communication profile. The secure communication layer is a layer that is defined by a communication profile intended to provide functional security to perform secure communication, and controls a secure communication function based on the communication profile. The application layer is a layer that controls a user interface with an operator or a maintainer. When the portable terminal 1, the on-board terminal 2, the on-board terminal 3, and the wireless base station 4 communicate with each other, a communication connection is established and the communication is maintained based on the communication profile of each layer. For example, when the portable terminal 1 or the on-board terminal 2 communicates with the wireless base station 4, a wireless communication layer 121 of the portable terminal 1 or the on-board terminal 2 and a wireless communication layer 421 of the wireless base station 4 establish a communication connection using a format that can be recognized by the both.

Similarly, a secure communication layer 122 of the portable terminal 1 or the on-board terminal 2 and a secure communication layer 422 of the wireless base station 4 establish a communication connection using a format that can be recognized by the both. Similarly, an application layer 123 of the portable terminal 1 or the on-board terminal 2 and an application layer 423 of the wireless base station 4 establish a communication connection using a format that can be recognized by the both.

Likewise, when the on-board terminal 3 and the wireless base station 4 communicate with each other, a wireless communication layer 321 of the on-board terminal 3 and the wireless communication layer 421 of the wireless base station 4 establish a communication connection using a format that can be recognized by the both. Similarly, a secure communication layer 322 of the on-board terminal 3 and the secure communication layer 422 of the wireless base station 4 establish a communication connection using a format that can be recognized by the both. Similarly, an application layer 323 of the on-board terminal 3 and the application layer 423 of the wireless base station 4 establish a communication connection using a format that can be recognized by the both. Note that the target data to be transmitted or received is encapsulated or decapsulated each time it passes each layer.

Figure 2:
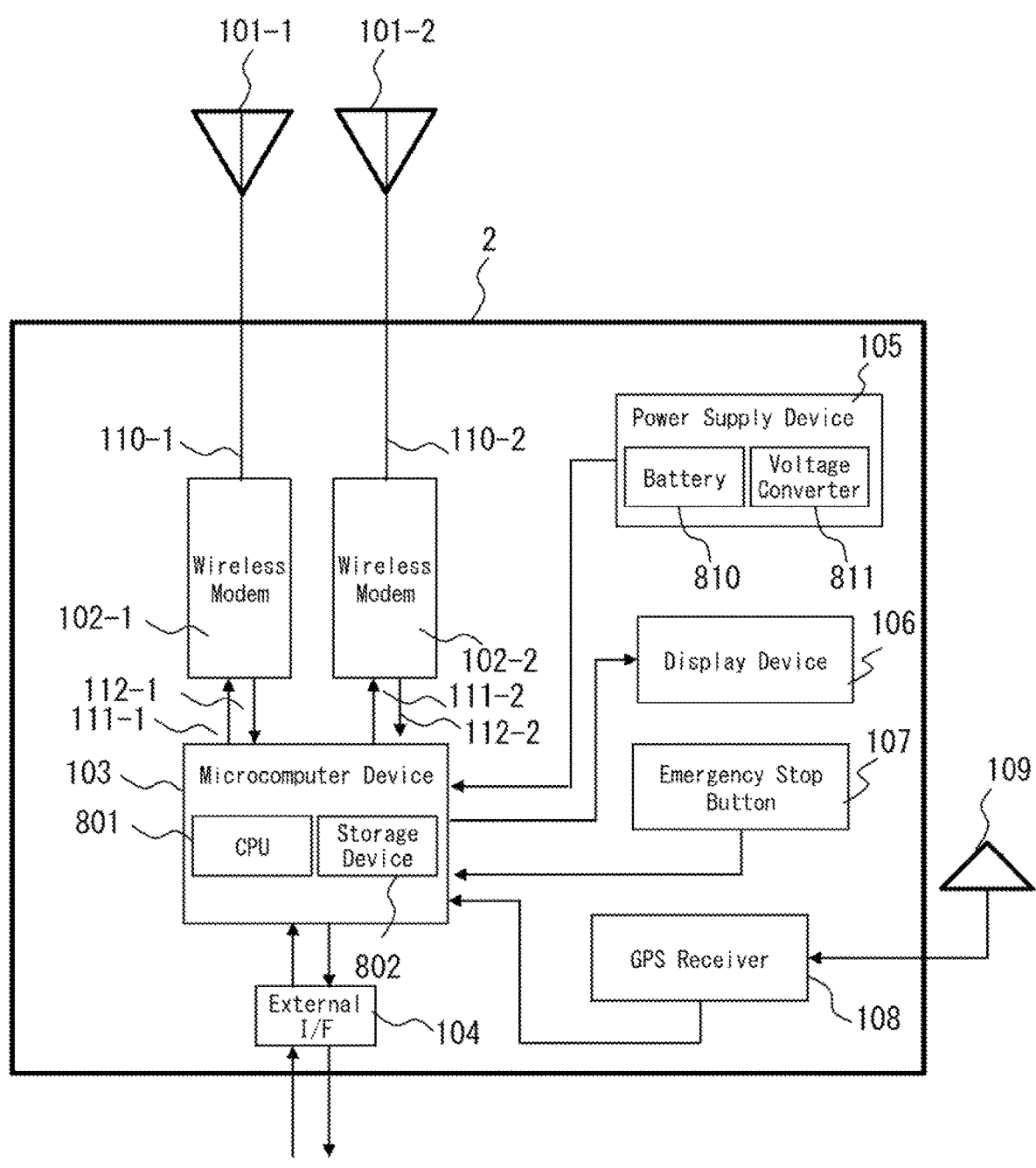
FIG. 2 is a block diagram illustrating a configuration example of an on-board terminal 2.
Figure 3:
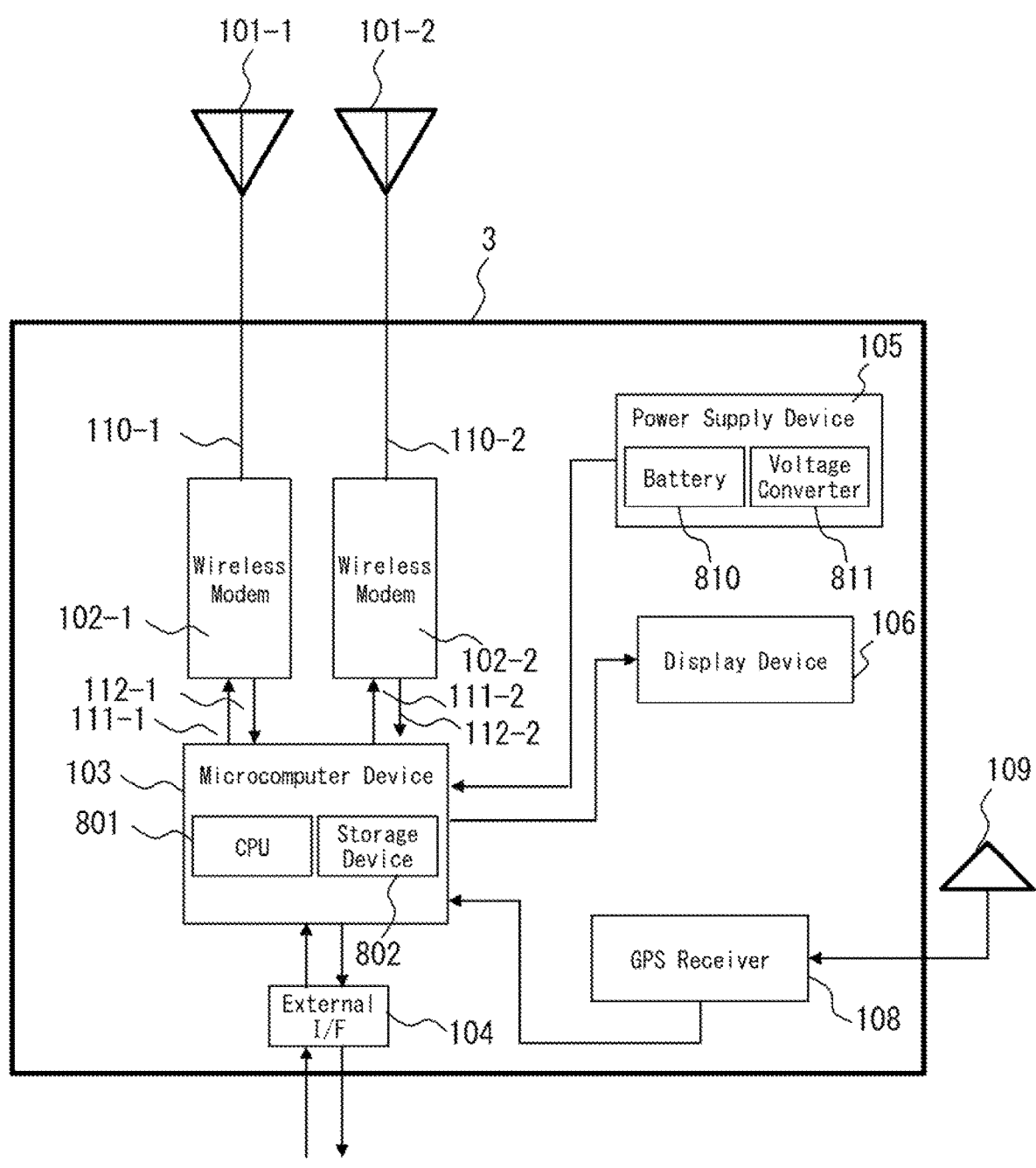
FIG. 3 is a block diagram illustrating a configuration example of an on-board terminal 3.

The microcomputer device 103 illustrated in FIGS. 2 and 3 executes the functions provided by the application layer 123 and the secure communication layer 122 of the portable terminal 1 or the on-board terminal 2 in FIG. 9. The microcomputer device 103 generates, as the function of the application layer 123, transmission data including an emergency stop signal indicating whether the emergency stop button 107 is pressed, and positional information representing the current own position transmitted from the GPS receiver. The microcomputer device 103 transfers the thus generated transmission data to the secure communication layer 122 as a lower layer.

Note that the emergency stop signal, which is a signal indicating that the emergency stop button 107 is pressed, is an emergency stop command signal for instructing each unmanned dump truck 10 to stop. The emergency stop signal, which is a signal indicating that the emergency stop button 107 is not pressed, is not an emergency stop command signal. In addition, the microcomputer device 103 provides, as the function of the secure communication layer 122, control information described below to the transmission data transferred with the application layer 123. With the control information, a transmission process is performed based on the communication profile intended to provide functional security. The transmission process herein is a process for taking security measures against any one or all of threats including data corruption, repetition, incorrect order, loss, delay, insertion, impersonation, and misdirection of data.

Figure 10:
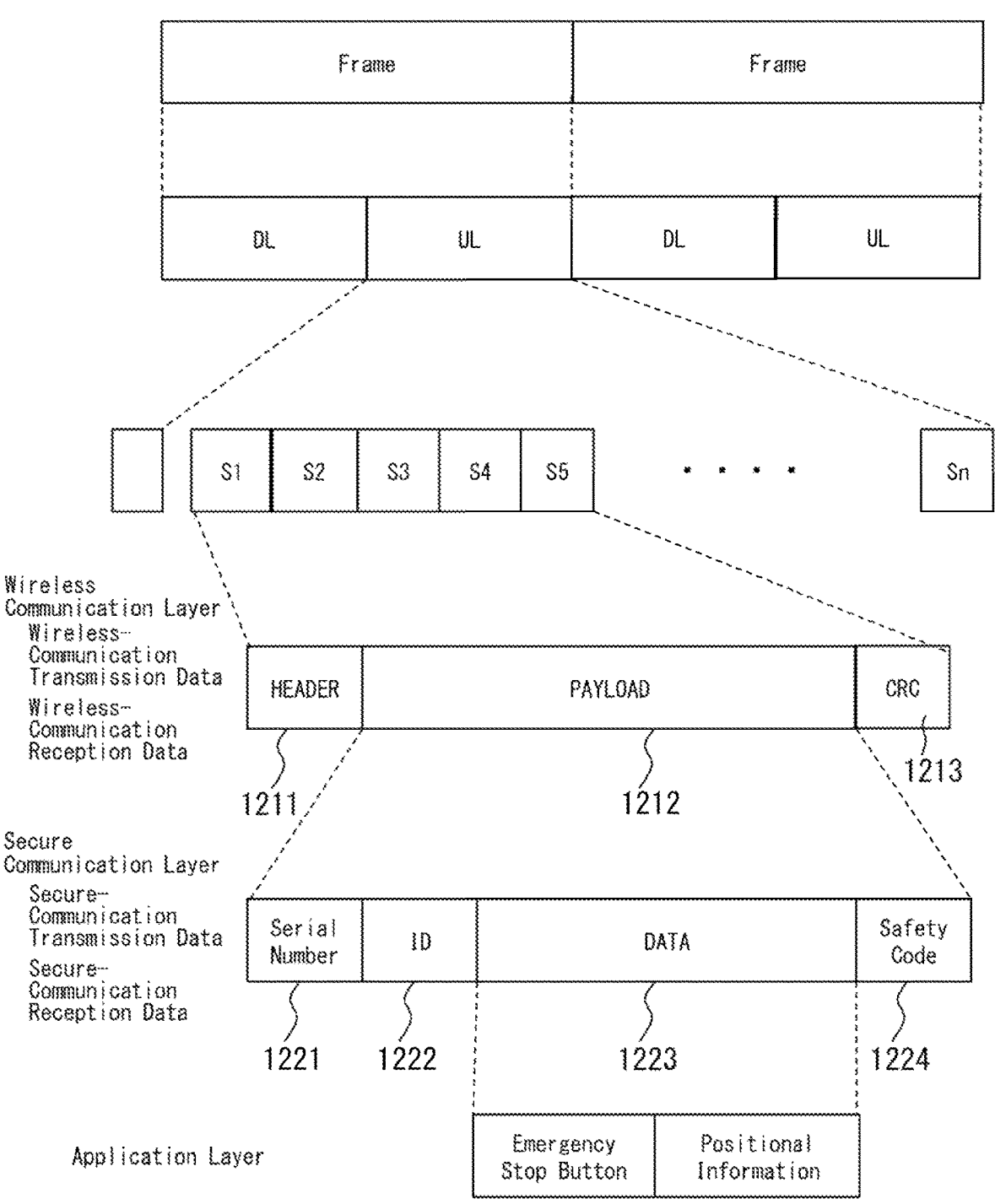
FIG. 10 is a schematic view illustrating exemplary data formats of a secure communication layer, a wireless communication layer, and an application layer.

FIG. 10 is a schematic view illustrating exemplary data formats of the secure communication layer, the wireless communication layer, and the application layer. The transmission data including the emergency stop signal and the positional information generated with the application layer 123 (FIG. 9) corresponds to DATA 1223 in the secure communication layer. As described above, the communication data of the application layer 123 (i.e., the third communication layer) includes an emergency stop signal and the positional information on the portable terminal 1 or the on-board terminal 2 (i.e., the manned vehicle 20).

The transmission data transmitted as the DATA 1223 is provided with a serial number 1221, ID 1222, and a safety code 1224 as security measures intended to provide functional security. The serial number 1221 is a sequential serial number (i.e., a sequence number) managed in the portable terminal 1 or the on-board terminal 2 on the transmission side. The ID 1222 is identification information for uniquely identifying the portable terminal 1 or the on-board terminal 2 on the transmission side. The safety code 1224 is a code for taking security measures against threats, such as data corruption, repetition, incorrect order, loss, delay, insertion, impersonation, and misdirection of data described above.

As described above, the communication data of the secure communication layer 122 (i.e., the second communication layer) includes the emergency stop signal, the positional information on the portable terminal 1 or the on-board terminal 2, that is, the manned vehicle 20, and the safety code 1224.

The microcomputer device 103 provides such control information to the DATA 1223 to generate secure-communication transmission data 111-1 and 111-2, and outputs the respective data to the first wireless modem 102-1 and the second wireless modem 102-2. The secure-communication transmission data 111-1 and 111-2 may be the same data. Note that the data format of the secure communication layer in FIG. 10 is only exemplary, and the present invention is not limited thereto.

Each of the first wireless modem 102-1 and the second wireless modem 102-2 illustrated in FIG. 2 has the function of the wireless communication layer 121 illustrated in FIG. 9. The first wireless modem 102-1 and the second wireless modem 102-2 respectively process the secure-communication transmission data 111-1 and 111-2, which have been generated with the secure communication layer 122, with the wireless communication layer 121 based on the communication profile intended to establish a wireless communication connection and maintain the communication.

As illustrated in FIG. 10, the secure-communication transmission data 111-1 and 111-2 correspond to a PAYLOAD 1212 in the wireless communication layer 121. The PAYLOAD 1212 is provided with a HEADER 1211 intended to establish a communication connection and maintain the communication, and a CRC (Cyclic Redundancy Code) 1213 as a data error detecting code so that wireless-communication transmission data is generated. The wireless-communication transmission data is transmitted by being divided into a plurality of subframes S. Note that the data format of the wireless communication layer in FIG. 10 is only exemplary, and the present invention is not limited thereto.

As described above, the wireless-communication transmission data of the wireless communication layer 121 (i.e., the first wireless communication layer) includes the emergency stop signal, the positional information on the portable terminal 1 or the on-board terminal 2, that is, the manned vehicle 20, the safety code 1224, and the CRC 1214.

As described above, adding functionally different data to each communication layer allows each function to be independently designed for each communication layer.

The wireless-communication transmission data generated with the wireless communication layer 121 is timing-adjusted to be transmitted as predetermined subframes, and is then subjected to processes, such as error correction coding, modulation, frequency conversion, amplification, and filtering, so that radio signals 110-1 and 110-2 are generated. The thus generated radio signals 110-1 and 110-2 are transmitted to the respective transmission/reception antennas 101. The transmission/reception antennas 101-1 and 101-2 radiate the radio signals 110-1 and 110-2, which have been respectively generated by the first wireless modem 102-1 and the second wireless modem 102-2, toward the wireless base station 4.

Meanwhile, the transmission/reception antennas 101-1 and 101-2 respectively receive radio signals 110-1 and 110-2 transmitted from the wireless base station 4 via wireless downward links, and transmit the received radio signals to the first wireless modem 102-1 and the second wireless modem 102-2. The first wireless modem 102-1 and the second wireless modem 102-2 respectively perform processes, such as filtering, amplification, frequency conversion, demodulation, and error correction decoding, on the radio signals 110-1 and 110-2 transmitted from the transmission/reception antennas 101-1 and 101-2, thereby generating wireless-communication reception data. Note that the data format of the wireless-communication reception data is the same as that of the wireless-communication transmission data in FIG. 10.

The first wireless modem 102-1 and the second wireless modem 102-2 perform, as the function of the wireless communication layer 121, a reception process on the respective wireless-communication reception data, which have been generated by the first wireless modem 102-1 and the second wireless modem 102-2, based on the communication profile intended to establish a wireless communication connection and maintain the communication, thereby generating secure-communication reception data 112-1 and 112-2. Note that the data format of the secure-communication reception data 112 is the same as that of the secure-communication transmission data 111 in FIG. 10. Examples of the reception process based on the communication profile intended to establish a wireless communication connection and maintain the communication include detection of synchronization, maintenance of synchronization, and error detection.

After performing the foregoing processes, the first wireless modem 102-1 and the second wireless modem 102-2 extract the PAYLOAD 1213 in the wireless-communication reception data, that is, the secure-communication reception data 112-1 and 112-2. The first wireless modem 102-1 and the second wireless modem 102-2 respectively output the thus generated secure-communication reception data 112-1 and 112-2 to the microcomputer device 103.

The microcomputer device 103 performs a reception process on the secure-communication reception data 112-1 and 112-2, which have been respectively generated by the first wireless modem 102-1 and the second wireless modem 102-2, based on the communication profile intended to provide functional security to perform secure communication. Then, the microcomputer device 103 generates DATA 1223 from the secure-communication reception data 112-1 and 112-2. The DATA 1223 generated herein is the received data that includes response data obtained in response to data on the emergency stop signal and the positional information that the on-board terminal 2 has transmitted before, and control data. The microcomputer device 103 performs a process of validating, of the secure-communication reception data 112-1 and 112-2 respectively output from the first wireless modem 102-1 and the second wireless modem 102-2, data that has arrived earlier, and discarding data that has arrived later. Although the configuration and the operation of the on-board terminal 2 have been described above, the configuration and the operation of the portable terminal 1 are similar thereto.

The microcomputer device 103 of the on-board terminal 3 executes the functions provided by the application layer 323 and the secure communication layer 322. The microcomputer device 103 generates, as the function of the application layer 323, transmission data including a response signal to the emergency stop signal indicating whether the emergency stop button 107 of the portable terminal 1 or the on-board terminal 2 is pressed, and positional information representing the current own position transmitted from the GPS receiver 108. The microcomputer device 103 transfers the thus generated transmission data to the secure communication layer 322 as a lower layer. Note that the response signal to the emergency stop signal herein is a signal indicating whether the emergency stop signal, which indicates whether the emergency stop button 107 of the portable terminal 1 or the on-board terminal 2 is pressed, is correctly received.

In addition, the microcomputer device 103 provides, as the function of the secure communication layer 322, control information described below to the transmission data transferred with the application layer 323. With the control information, a transmission process is performed based on the communication profile intended to provide functional security. The transmission process herein is a process for taking security measures against any one or all of threats including data corruption, repetition, incorrect order, loss, delay, insertion, impersonation, and misdirection of data.

FIG. 10 is a view illustrating exemplary data formats of the secure communication layer, the wireless communication layer, and the application layer. The transmission data including the emergency stop signal and the positional information generated with the application layer 323 (FIG. 9) corresponds to DATA 1223 in the secure communication layer. As described above, the communication data of the application layer 323 (i.e., the third communication layer) includes the positional information on the on-board terminal 3.

The transmission data transmitted as the DATA 1223 is provided with a serial number 1221. ID 1222, and a safety code 1224 as security measures intended to provide functional security. The serial number 1221 is a sequential serial number (i.e., a sequence number) managed in the on-board terminal 3 on the transmission side. The ID 1222 is identification information for uniquely identifying the on-board terminal 3 on the transmission side. The safety code 1224 is a code for taking security measures against threats, such as data corruption, repetition, incorrect order, loss, delay, insertion, impersonation, and misdirection of data described above.

As described above, the communication data of the secure communication layer 322 (i.e., the second communication layer) includes the emergency stop signal, the positional information on the on-board terminal 3, and the safety code 1224.

The microcomputer device 103 provides such control information to the DATA 1223 to generate secure-communication transmission data 111-1 and 111-2, and outputs the respective data to the first wireless modem 102-1 and the second wireless modem 102-2. The secure-communication transmission data 111-1 and 111-2 may be the same data. Note that the data format of the secure communication layer in FIG. 10 is only exemplary, and the present invention is not limited thereto.

Each of the first wireless modem 102-1 and the second wireless modem 102-2 has the function of the wireless communication layer 321. The first wireless modem 102-1 and the second wireless modem 102-2 respectively process the secure-communication transmission data 111-1 and 111-2, which have been generated with the secure communication layer 322, with the wireless communication layer 321 based on the communication profile intended to establish a wireless communication connection and maintain the communication.

As illustrated in FIG. 10, the secure-communication transmission data 111-1 and 111-2 correspond to a PAYLOAD 1212 in the wireless communication layer 321. The PAYLOAD 1212 is provided with a HEADER 1211 intended to establish a communication connection and maintain the communication, and a CRC (Cyclic Redundancy Code) 1213 as a data error detecting code so that wireless-communication transmission data is generated. The wireless-communication transmission data is transmitted by being divided into a plurality of subframes S (SI to Sn). Note that the data format of the wireless communication layer in FIG. 10 is only exemplary, and the present invention is not limited thereto.

As described above, the wireless-communication transmission data of the wireless communication layer 321 (i.e., the first wireless communication layer) includes the emergency stop signal, the positional information on the on-board terminal 3, the safety code 1224, and the CRC 1214. Adding functionally different data to each communication layer allows each function to be independently designed for each communication layer.

The wireless-communication transmission data generated with the wireless communication layer 321 is timing-adjusted to be transmitted as predetermined subframes, and is then subjected to processes, such as modulation, frequency conversion, amplification, and filtering, so that radio signals are generated. The thus generated radio signals are transmitted to the respective transmission/reception antennas 101. The transmission/reception antennas 101-1 and 101-2 radiate the radio signals, which have been respectively generated by the first wireless modem 102-1 and the second wireless modem 102-2, toward the wireless base station 4.

Meanwhile, the transmission/reception antennas 101-1 and 101-2 respectively receive radio signals transmitted from the wireless base station 4 via wireless downward links, and transmit the received radio signals to the first wireless modem 102-1 and the second wireless modem 102-2. The first wireless modem 102-1 and the second wireless modem 102-2 respectively perform processes, such as filtering, amplification, frequency conversion, demodulation, and error correction decoding, on the radio signals transmitted from the transmission/reception antennas 101-1 and 101-2, thereby generating wireless-communication reception data. Note that the data format of the wireless-communication reception data is the same as that of the wireless-communication transmission data in FIG. 10.

The first wireless modem 102-1 and the second wireless modem 102-2 perform, as the function of the wireless communication layer 321, a reception process on the respective wireless-communication reception data, which have been generated by the first wireless modem 102-1 and the second wireless modem 102-2, based on the communication profile intended to establish a wireless communication connection and maintain the communication, thereby generating secure-communication reception data 112-1 and 112-2. Note that the data format of the secure-communication reception data 112 is the same as that of the secure-communication transmission data 111 in FIG. 10. Examples of the reception process based on the communication profile intended to establish a wireless communication connection and maintain the communication include detection of synchronization, maintenance of synchronization, and error detection.

After performing the foregoing processes, the first wireless modem 102-1 and the second wireless modem 102-2 extract the PAYLOAD 1213 in the wireless-communication reception data, that is, the secure-communication reception data 112-1 and 112-2. The first wireless modem 102-1 and the second wireless modem 102-2 respectively output the thus generated secure-communication reception data 112-1 and 112-2 to the microcomputer device 103.

The microcomputer device 103 performs a reception process on the secure-communication reception data 112-1 and 112-2, which have been respectively generated by the first wireless modem 102-1 and the second wireless modem 102-2, based on the communication profile intended to provide functional security to perform secure communication. Then, the microcomputer device 103 generates DATA 1223 from the secure-communication reception data 112-1 and 112-2. The DATA 1223 generated herein is the received data that includes response data obtained in response to data on the emergency stop signal and the positional information that the microcomputer device 103 has transmitted before, and control data. The microcomputer device 103 performs a process of validating, of the secure-communication reception data 112-1 and 112-2 respectively output from the first wireless modem 102-1 and the second wireless modem 102-2, data that has arrived earlier, and discarding data that has arrived later.

Next, the transmission operation of the on-board terminal 2 of the first embodiment will be specifically described with reference to a flowchart in FIG. 11. The flowchart in FIG. 11 is executed in a predetermined time cycle (e.g., once every second).

In the on-board terminal 2, the handover threshold Thr1 for the wireless modem 102-1 is set using an input device (not illustrated) connected to the on-board terminal 2 via the external i/F 104, for example (step S002). For example, as illustrated in FIG. 3, the handover threshold Thr1 for the first wireless modem 102-1 can be set to 3 dB. The thus set threshold Thr1 is stored in the storage device 802 of the microcomputer device 103, for example.

Further, in the on-board terminal 2, the handover threshold Thr2 for the second wireless modem 102-2 is set (step S006). For example, as illustrated in FIG. 3, the handover threshold Thr2 for the second wireless modem 102-2 can be set to 6 dB.

Herein, each of the thresholds Thr1 and Thr2 may be either a static value determined in advance from the model and the maximum travel speed of the manned vehicle 20 as well as the maximum load capacity of the unmanned dump truck 10, or a dynamic value determined from the model and the current travel speed of the manned vehicle 20 as well as the current weight of the load carried by the manned vehicle 20. The on-board terminal 2 may receive from the external I/F 104 detection signals of a speed sensor and a weight sensor, which measures the weight of the carried load, of the manned vehicle 20 so that the thresholds Thr1 and Thr2 may be determined in accordance with the detection signals.

After the handover threshold Thr1 for the first wireless modem 102-1 is set, the GPS antenna 109 of the on-board terminal 2 receives a GPS signal (step S003), and the GPS receiver 108 obtains positional information representing the current position of the manned vehicle 20 based on the GPS signal (step S004). Then, the microcomputer device 103 generates the own positional information data for the first wireless modem 102-1 (step S00S).

After the handover threshold Thr2 for the second wireless modem 102-2 is set, the GPS antenna 109 of the on-board terminal 2 receives a GPS signal (step S007), and the GPS receiver 108 obtains positional information representing the current position of the manned vehicle 20 based on the GPS signal (step S008). Then, the microcomputer device 103 generates the own positional information data for the second wireless modem 102-2 (step S009).

Next, the process proceeds to step S010, and it is determined if the emergency stop button 107 of the on-board terminal 2 is pressed. If it is determined that the emergency stop button 107 is not pressed (No in step S010), the microcomputer device 103 generates an emergency stop signal "0" with the application layer 123 (step S011). Meanwhile, if it is determined that the emergency stop button 107 is pressed (Yes in step S010), the microcomputer device 103 generates an emergency stop signal "1" with the application layer 123 (step S012). The emergency stop signal "1" is a signal indicating that the emergency stop button 107 is pressed.

Then, the microcomputer device 103 generates transmission data including the obtained positional information and the emergency stop signal ("0" or "1") (step S013). The generated transmission data is subjected to a transmission process necessary to provide functional security with the secure communication layer 122, and is then transmitted to the first wireless modem 102-1 and the second wireless modem 102-2 (step S014).

The first wireless modem device 102-1 performs processes, such as error correction coding, modulation, frequency conversion, amplification, and filtering, which are transmission processes necessary to perform wireless communication, on the received data with the wireless communication layer 121 (step S015), and then transmits a radio signal from the transmission/reception antenna 101-1 (step S016). After the completion of step S016, the process returns back to START (S001) once every second so that similar operations are repeated.

Likewise, the second wireless modem device 102-2 performs processes, such as error correction coding, modulation, frequency conversion, amplification, and filtering, which are transmission processes necessary to perform wireless communication, on the received data with the wireless communication layer 121 (step S017), and then transmits a radio signal from the transmission/reception antenna 101-2 (step S018). After the completion of step S016, the process returns back to START (S001) once every second so that similar operations are repeated.

As the transmission operation is performed in accordance with the flowchart in FIG. 11, the positional information on the on-board terminal 2 is periodically transmitted, and the emergency stop signal "1" is continuously transmitted (that is, an emergency stop command signal is transmitted) while the emergency stop button 107 is pressed (S010: Yes). Meanwhile, when the emergency stop button 107 is no longer pressed (S010: No), the microcomputer device 103 transmits the emergency stop signal "0." Although the transmission operation of the on-board terminal 2 has been described above with reference to the flowchart in FIG. 11, the transmission operation of the portable terminal 1 is performed in a substantially similar manner.

Figure 12:
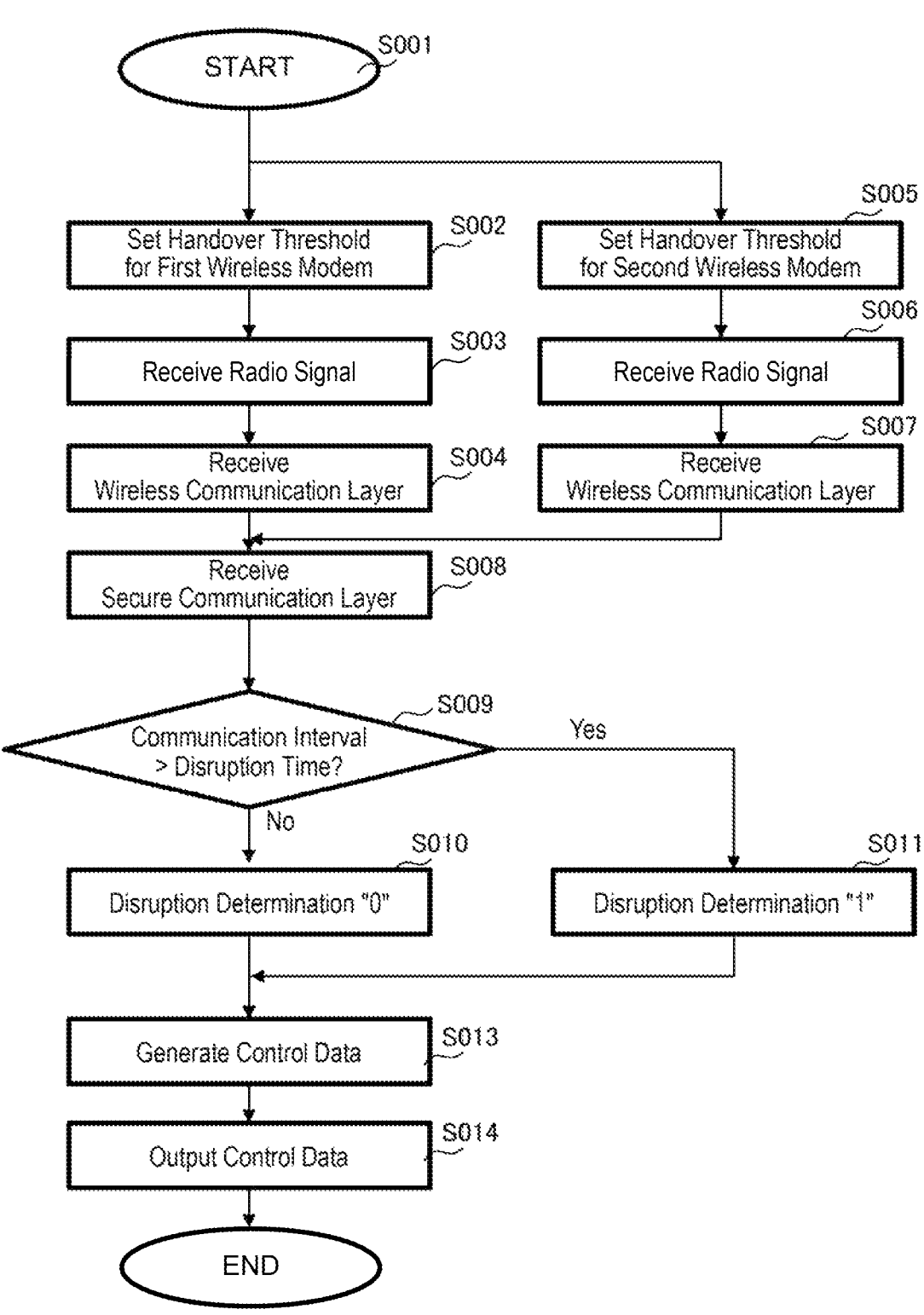
FIG. 12 is a flowchart specifically illustrating the reception operation of the on-board terminal 3 of the first embodiment.

Next, the reception operation of the on-board terminal 3 will be specifically described with reference to a flowchart in FIG. 12. The flowchart in FIG. 12 is executed in a predetermined time cycle (e.g., once every second).

In the on-board terminal 3, the handover threshold Thr1 for the first wireless modem 102-1 is set (step S002). For example, the handover threshold Thr1 for the first wireless modem 102-1 is set to 3 dB.

In addition, in the on-board terminal 3, the handover threshold Thr2 for the second wireless modem 102-2 is set (step S005). For example, the handover threshold Thr2 for the first wireless modem 102-1 is set to 6 dB.

Herein, each of the thresholds Thr1 and Thr2 may be either a static value determined in advance from the model and the maximum travel speed of the unmanned dump truck 10 as well as the maximum load capacity of the unmanned dump truck 10, or a dynamic value determined from the model and the current travel speed of the unmanned dump truck 10 as well as the current weight of the load carried by the unmanned dump truck 10. The on-board terminal 3 may receive from the external I/F 104 detection signals of a speed sensor and a weight sensor, which measures the weight of the carried load, of the manned vehicle 20 so that the thresholds Thr1 and Thr2 may be determined in accordance with the detection signals.

When a radio signal is received from the first wireless transmission/reception antenna 101-1 (step S003), the received radio signal is subjected to processes, such as filtering, amplification, frequency conversion, demodulation, and error correction decoding, which are reception processes necessary to perform wireless communication, with the wireless communication layer 121 of the first wireless modem device 102-1 (step S004).

Likewise, when a radio signal is received from the second transmission/reception antenna 101-2 (step S006), the received radio signal is subjected to processes, such as filtering, amplification, frequency conversion, demodulation, and error correction decoding, which are reception processes necessary to perform wireless communication, with the wireless communication layer 121 of the second wireless modem device 102-2 (step S007).

The microcomputer device 103 performs a reception process on the secure-communication reception data 112-1 and 112-2, which have been respectively generated by the first wireless modem 102-1 and the second wireless modem 102-2, based on the communication profile intended to provide functional security to perform secure communication (step S008). The microcomputer device 103 performs a process of validating, of the secure-communication reception data 112-1 and 112-2 respectively output from the first wireless modem 102-1 and the second wireless modem 102-2, data that has arrived earlier, and discarding data that has arrived later.

The microcomputer device 103 generates the DATA 1223 from the secure-communication reception data 112 in accordance with one of the secure-communication reception data 112-1 and 112-2 that has arrived earlier. The DATA 1223 generated herein is the received data that includes response data obtained in response to data on the emergency stop signal and the positional information that the microcomputer device 103 has transmitted before, and control data.

Next, the process proceeds to step S009, and a communication interval is measured from the difference between the reception time of the data received the last time and the reception time of the data received this time. Then, it is determined if the measured communication interval is over a predetermined disruption time.

If it is determined that the measured communication interval is not over the predetermined disruption time (No in step S009), the microcomputer device 103 generates a disruption determination signal "0" with the application layer 123 (step S010). Meanwhile, if it is determined that the measured communication interval is over the predetermined disruption time (Yes in step S009), the microcomputer device 103 generates a disruption determination signal "1" with the application layer 123 (step S011). The disruption determination signal "1" means that the communication has been disrupted for a period of greater than or equal to a predetermined time.

Then, the microcomputer device 103 generates control data including the obtained disruption determination signal ("0" or "1") and the emergency stop signal (step S013). The thus generated control data is converted into a voltage and a protocol necessary for an external device with the external I/F 104, and then, the voltage and the protocol are output to the external device (step S014). The external device is connected to a BCU (Brake Control Unit) mounted on the unmanned dump truck 10, for example. After the completion of step S014, the process is looped to START (S001) once every second. Note that a process of decelerating or emergently stopping the unmanned dump truck 10, for example, is executed based on the disruption determination signal and the emergency stop signal output to the external device from the external I/F 104, and the determination of whether to specifically execute such a process is appropriately made in the unmanned dump truck 10, for example.

As described above, according to the system of the first embodiment, a plurality of wireless modems in each terminal are provided with different handover thresholds so that handover processes are executed at different timings. Accordingly, a vehicle control system can be provided that can prevent delays and losses in packet communication, prevent handover failures, and improve productivity while ensuring safety for various types of vehicles.

Second Embodiment

A vehicle control system according to a second embodiment will be described with reference to FIG. 13. The overall configuration of the vehicle control system of the second embodiment may be similar to that of the first embodiment (FIG. 1). The second embodiment is also identical to the first embodiment in that each of the on-board terminals 2 and the on-board terminals 3 includes a plurality of wireless modems (102-1 and 102-2). However, the second embodiment differs from the first embodiment in the configuration for allowing the plurality of wireless modems to execute handover processes at different timings.

The configurations of the on-board terminal 2 and the on-board terminal 3 for implementing the second embodiment will be respectively described with reference to FIGS. 13 and 14. Components in FIGS. 13 and 14 that are identical to those of the first embodiment (FIGS. 2 and 3) are denoted by the same reference signs as those in FIGS. 2 and 3. Thus, overlapped description will be omitted hereinafter.

Figure 13:
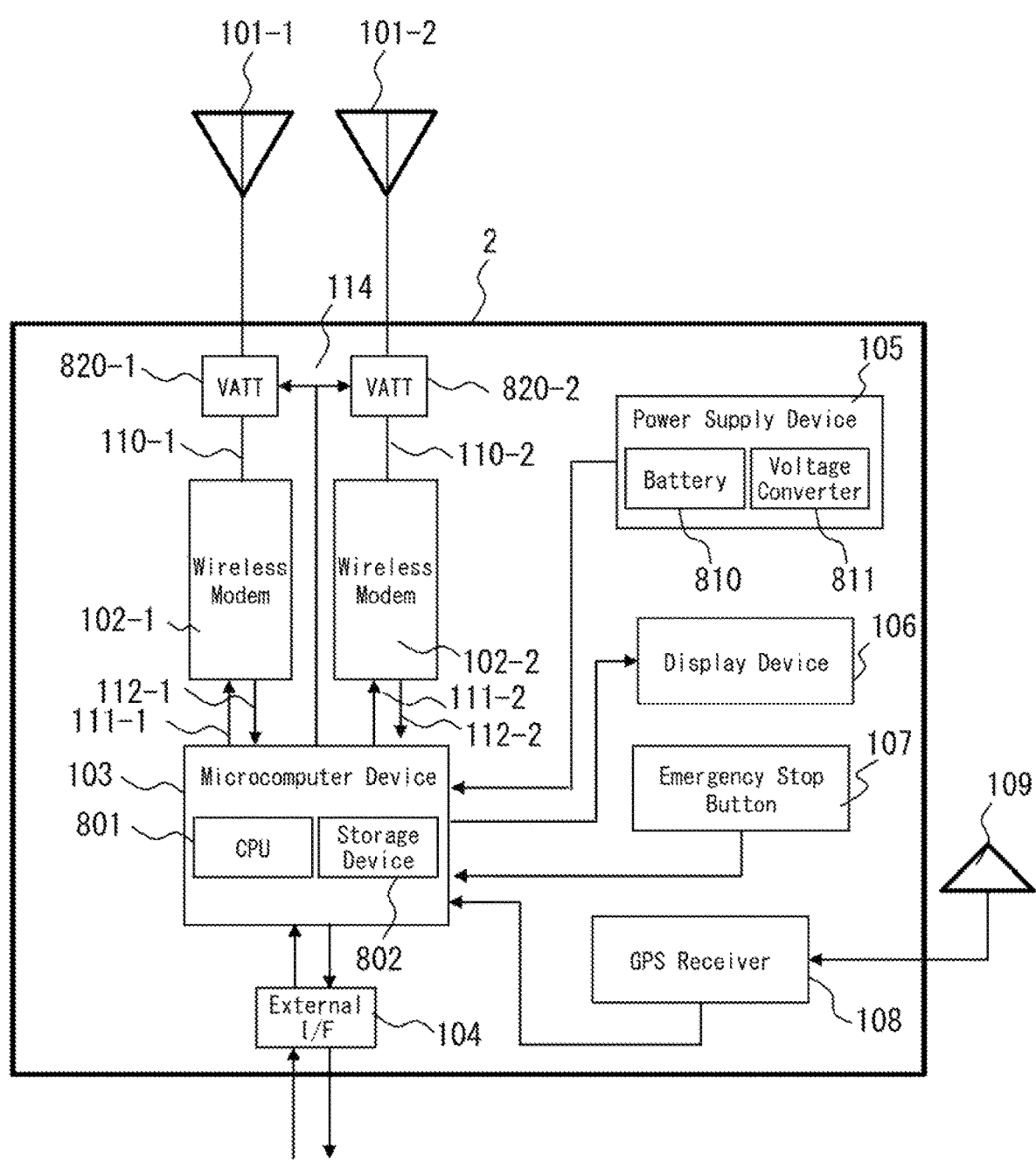
FIG. 13 is a block diagram illustrating a configuration example of the on-board terminal 2 according to a second embodiment.
Figure 14:
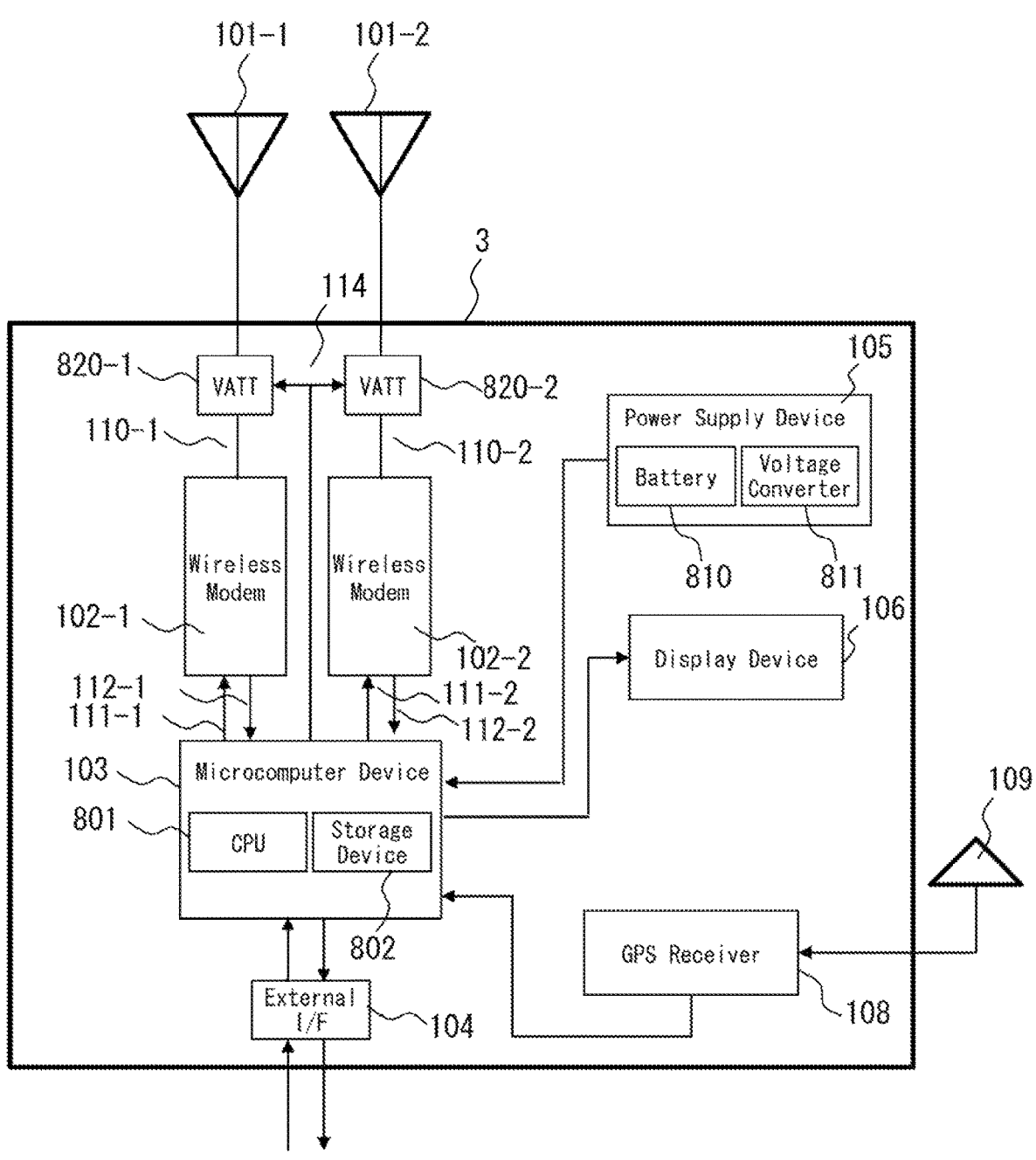
FIG. 14 is a block diagram illustrating a configuration example of the on-board terminal 3 according to the second embodiment.

As illustrated in FIGS. 13 and 14, each of the on-board terminals 2 and 3 includes variable attenuators (VATTs) 820-1 and 820-2 in addition to the components of the first embodiment. The VATTs 820-1 AND 820-2 are respectively connected between the transmission/reception antennas 101-1 and 101-2 and the wireless modems 102-1 and 102-2.

Radio signals received by the transmission/reception antennas 101-1 and 101-2 from the wireless base station 4 are respectively input to the wireless modems 102-1 and 102-2 via the VATTs 820-1 and 820-2. The wireless modems 102-1 and 102-2 perform filtering, amplification, frequency conversion, demodulation, and error correction decoding on the respective radio signals, and then respectively output reception data 112-1 and 112-2 to the microcomputer device 103. In addition, the wireless modems 102-1 and 102-2 respectively perform processes, such as error correction coding, modulation, frequency conversion, amplification, and filtering, on transmission data 111-1 and 111-2 output from the microcomputer device 103, thereby generating radio signals 110, and then output the radio signals 110 to the respective transmission/reception antennas 101.

Each of the VATTs 820-1 and 820-2 is a device with a variable attenuation level, and has a function of being able to change its attenuation level. Herein, each of the VATTs 820-1 and 820-2 is connected to the microcomputer device 103, and can have its attenuation level changed in response to a command input thereto from an external input device via the microcomputer device 103.

Figure 15:
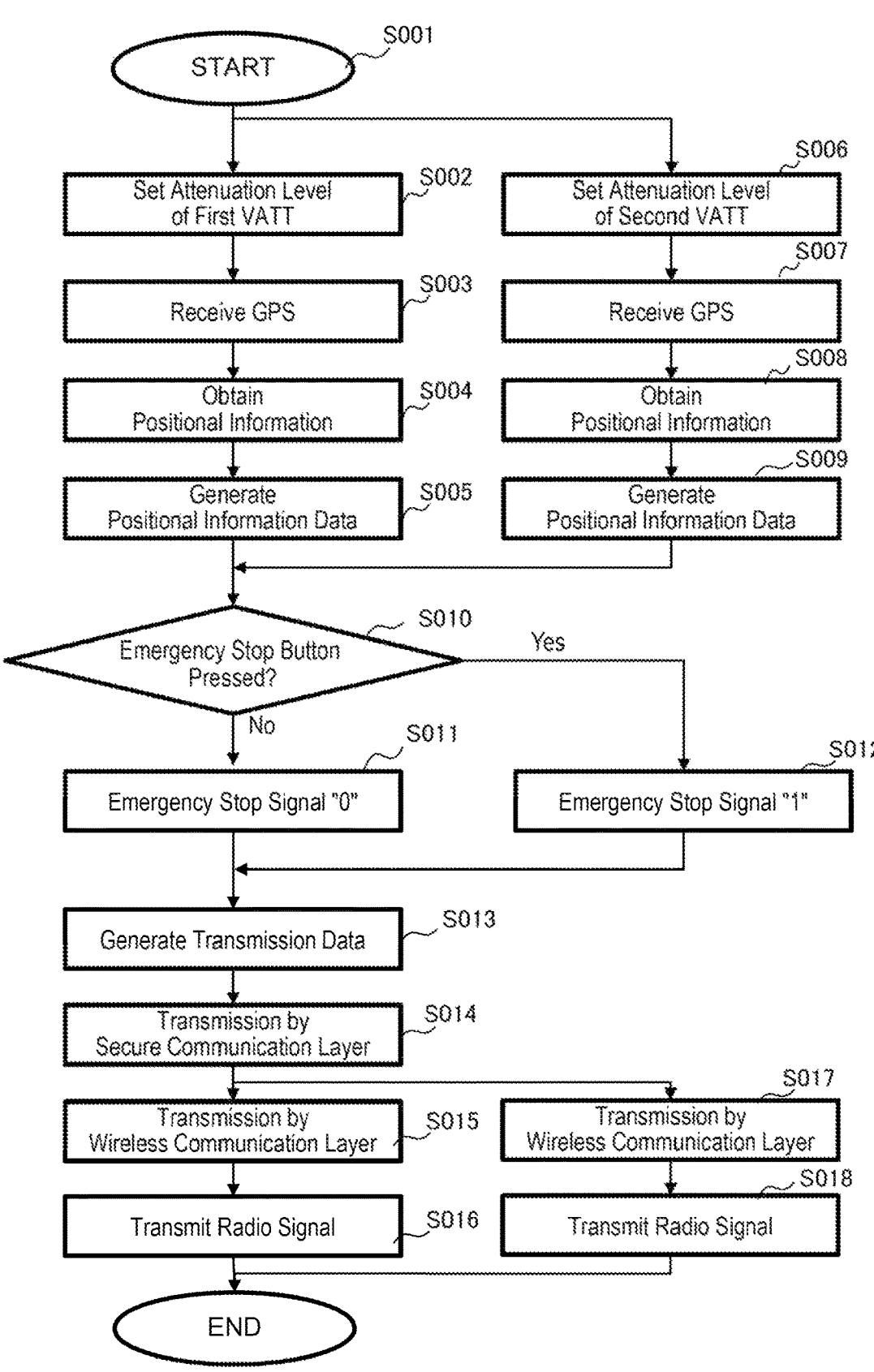
FIG. 15 is a flowchart specifically illustrating the transmission operation of the on-board terminal 2 of the second embodiment.

Next, the transmission operation of the on-board terminal 2 will be specifically described with reference to a flowchart in FIG. 15. The flowchart in FIG. 15 is executed in a predetermined time cycle (e.g., once every second).

In the on-board terminal 2, an attenuation level Vatt1 of the VATT 820-1 is set using an input device (not illustrated) connected to the on-board terminal 2 via the external I/F 104, for example (step S002). For example, the attenuation level Vatt1 of the VATT 820-1 can be set to 3 dB.

Further, in the on-board terminal 2, an attenuation level Vatt2 of the VATT 820-2 is set using an input device (not illustrated) connected to the on-board terminal 2 via the external I/F 104, for example (step S006). For example, the attenuation level Vatt2 of the VATT 820-2 can be set to 6 dB.

Herein, each of the attenuation level Vatt1 of the VATT 820-1 and the attenuation level Vatt2 of the VATT 820-2 may be either a static value determined in advance from the model and the maximum travel speed of the manned vehicle 20 as well as the maximum load capacity of the manned vehicle 20, or a dynamic value determined from the model and the current travel speed of the manned vehicle 20 as well as the current weight of the load carried by the manned vehicle 20. The on-board terminal 2 may receive from the external I/F 104 detection signals of a speed sensor and a weight sensor, which measures the weight of the carried load, of the manned vehicle 20 so that the attenuation levels Vatt1 and Vatt2 may be determined in accordance with the detection signals.

After the attenuation level Vatt1 of the VATT 820-1 is set, the GPS antenna 109 of the on-board terminal 2 receives a GPS signal (step S003), and the GPS receiver 108 obtains positional information representing the current position of the manned vehicle 20 based on the GPS signal (step S004). Then, the microcomputer device 103 generates the own positional information data for the first wireless modem 102-1 (step S005).

Meanwhile, after the attenuation level Vatt2 of the VATT 820-2 is set, the GPS antenna 109 of the on-board terminal 2 receives a GPS signal (step S007), and the GPS receiver 108 obtains positional information representing the current position of the manned vehicle 20 based on the GPS signal (step S008). Then, the microcomputer device 103 generates the own positional information data for the second wireless modem 102-2 (step S009).

Next, the process proceeds to step S010, and it is determined if the emergency stop button 107 of the on-board terminal 2 is pressed. If it is determined that the emergency stop button 107 is not pressed (No in step S010), the microcomputer device 103 generates an emergency stop signal "0" with the application layer 123 (step S011). Meanwhile, if it is determined that the emergency stop button 107 is pressed (Yes in step S010), the microcomputer device 103 generates an emergency stop signal "1" with the application layer 123 (step S012). The emergency stop signal "1" is a signal indicating that the emergency stop button 107 is pressed.

Then, the microcomputer device 103 generates transmission data including the obtained positional information and the emergency stop signal ("0" or "1") (step S013). The generated transmission data is subjected to a transmission process necessary to provide functional security with the secure communication layer 122, and is then transmitted to the first wireless modem 102-1 and the second wireless modem 102-2 (step S014).

The first wireless modem device 102-1 performs processes, such as error correction coding, modulation, frequency conversion, amplification, and filtering, which are transmission processes necessary to perform wireless communication, on the received data with the wireless communication layer 121 (step S015), and then transmits a radio signal from the transmission/reception antenna 101-1 (step S016). After the completion of step S016, the process returns back to START (S001) once every second so that similar operations are repeated.

Likewise, the second wireless modem device 102-2 performs processes, such as error correction coding, modulation, frequency conversion, amplification, and filtering, which are transmission processes necessary to perform wireless communication, on the received data with the wireless communication layer 121 (step S017), and then transmits a radio signal from the transmission/reception antenna 101-2 (step S018). After the completion of step S016, the process returns back to START (S001) once every second so that similar operations are repeated.

As the transmission operation is performed in accordance with the flowchart in FIG. 15, the positional information on the on-board terminal 2 is periodically transmitted, and the emergency stop signal "I" is continuously transmitted (that is, an emergency stop command signal is transmitted) while the emergency stop button 107 is pressed (S010: Yes). Meanwhile, when the emergency stop button 107 is no longer pressed (S010: No), the microcomputer device 103 transmits the emergency stop signal "0." Although the operation of the on-board terminal 2 has been described above with reference to the flowchart in FIG. 15, the transmission operation of the portable terminal 1 is performed in a similar manner.

Figure 16:
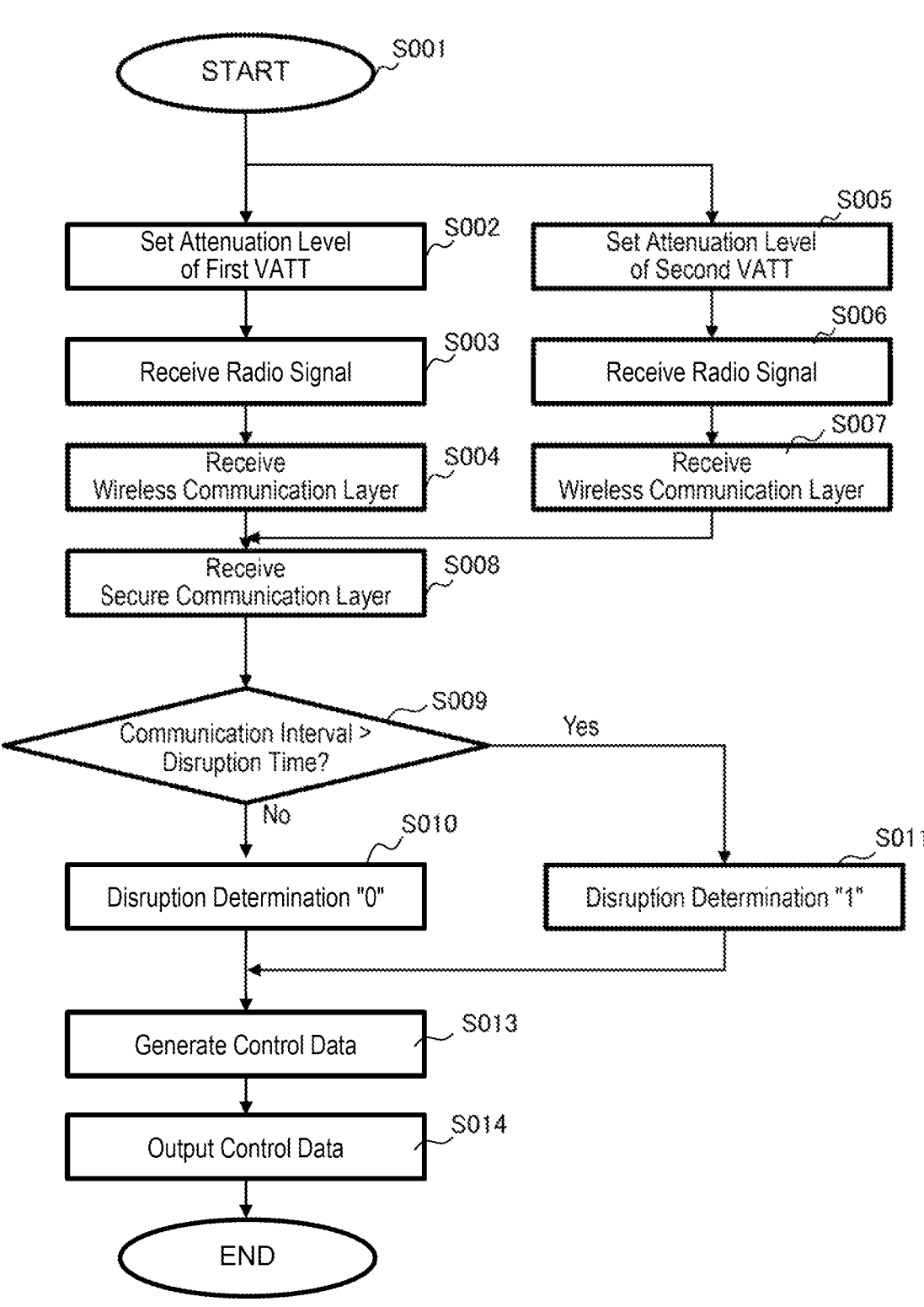
FIG. 16 is a flowchart specifically illustrating the reception operation of the on-board terminal 3 of the second embodiment.

Next, the reception operation of the on-board terminal 3 will be specifically described with reference to a flowchart in FIG. 16. The flowchart in FIG. 16 is executed in a predetermined time cycle (e.g., once every second).

In the on-board terminal 3, the attenuation level Vatt1 of the VATT 820-1 is set (step S002). For example, the attenuation level Vatt1 of the VATT 820-1 is set to 3 dB.

In addition, in the on-board terminal 3, the attenuation level Vatt2 of the VATT 820-2 is set (step S005). For example, the attenuation level Vatt2 of the VATT 820-2 is set to 6 dB.

Herein, each of the attenuation level Vatt1 of the VATT 820-1 and the attenuation level Vatt2 of the VATT 820-2 may be either a static value determined in advance from the model and the maximum travel speed of the unmanned dump truck 10 as well as the maximum load capacity of the unmanned dump truck 10, or a dynamic value determined from the model and the current travel speed of the unmanned dump truck 10 as well as the current weight of the load carried by the unmanned dump truck 10. The on-board terminal 3 may receive from the external I/F 104 detection signals of a speed sensor and a weight sensor, which measures the weight of the carried load, of the unmanned dump truck 10 so that the attenuation levels Vatt1 and Vatt2 may be determined in accordance with the detection signals.

When a radio signal is received from the first transmission/reception antenna 101-1 (step S003), the received radio signal is subjected to processes, such as filtering, amplification, frequency conversion, demodulation, and error correction decoding, which are reception processes necessary to perform wireless communication, with the wireless communication layer 121 of the first wireless modem device 102-1 (step S004).

Likewise, when a radio signal is received from the second transmission/reception antenna 101-2 (step 006), the received radio signal is subjected to processes, filtering, amplification, frequency conversion, demodulation, and error correction decoding, which are reception processes necessary to perform wireless communication, with the wireless communication layer 121 of the second wireless modem device 102-2 (step S007).

The microcomputer device 103 performs a reception process on the secure-communication reception data 112-1 and 112-2, which have been respectively generated by the first wireless modem 102-1 and the second wireless modem 102-2, based on the communication profile intended to provide functional security to perform secure communication (step S008). The microcomputer device 103 performs a process of validating, of the secure-communication reception data 112-1 and 112-2 respectively output from the first wireless modem 102-1 and the second wireless modem 102-2, data that has arrived earlier, and discarding data that has arrived later.

The microcomputer device 103 generates the DATA 1223 from the secure-communication reception data 112 in accordance with one of the secure-communication reception data 112-1 and 112-2 that has arrived earlier. The DATA 1223 generated herein is the received data that includes response data obtained in response to data on the emergency stop signal and the positional information that the microcomputer device 103 has transmitted before, and control data.

Next, the process proceeds to step S009, and a communication interval is measured from the difference between the reception time of the data received the last time and the reception time of the data received this time. Then, it is determined if the measured communication interval is over a predetermined disruption time.

If it is determined that the measured communication interval is not over the predetermined disruption time (No in step S009), the microcomputer device 103 generates a disruption determination signal "0" with the application layer 123 (step S010). Meanwhile, if it is determined that the measured communication interval is over the predetermined disruption time (Yes in step S009), the microcomputer device 103 generates a disruption determination signal "1" with the application layer 123 (step S011).

Then, the microcomputer device 103 generates control data including the obtained disruption determination signal ("0" or "1") and the emergency stop signal (step S013). The thus generated control data is converted into a voltage and a protocol necessary for an external device with the external I/F 104, and then, the voltage and the protocol are output to the external device (step S014). Herein, the external device is connected to a BCU (Brake Control Unit) mounted on the unmanned dump truck 10, for example. After the completion of step S014, the process is looped to START (S001) once every second. Note that a process of decelerating or emergently stopping the unmanned dump truck 10, for example, is executed based on the disruption determination signal and the emergency stop signal output to the external device from the external I/F 104, and the determination of whether to specifically execute such a process is appropriately made in the unmanned dump truck 10, for example.

Provided that:

the received power of a radio signal transmitted from the wireless base station 4-1 to the first wireless modem 102-1 is Prx11, the received power of a radio signal transmitted from the wireless base station 4-1 to the second wireless modem 102-2 is Prx12, the received power of a radio signal transmitted from the wireless base station 4-2 to the first wireless modem 102-1 is Prx21, the received power of a radio signal transmitted from the wireless base station 4-2 to the second wireless modem 102-2 is Prx22, the handover threshold of the first wireless modem 102-1 is Thr1', and the handover threshold of the second wireless modem 102-2 is Thr2', a method of starting a handover in the second embodiment is desirably a method of starting a handover process with the first wireless modem 102-1 when Prx11<Thr1' or Prx21>Thr1' is satisfied, and starting a handover process with the second wireless modem 102-2 when Prx12<Thr2' or Pr22>Thr2' is satisfied, for example. In the case of LTE, the threshold serves as a trigger to start the transmission of a measurement report message, which also serves as a trigger to start a handover process. The thresholds Thr1' and Thr2' herein are different from the thresholds Thr1 and Thr2 of the first embodiment.

As described above, according to the system of the second embodiment, a plurality of wireless modems in each terminal are provided with different attenuation levels by variable attenuators so that handover processes are executed at different timings. Accordingly, a vehicle control system can be provided that can prevent delays and losses in packet communication, prevent handover failures, and improve productivity while ensuring safety for various types of vehicles.

Note that the present invention is not limited to the foregoing embodiments, and includes a variety of variations. For example, although the foregoing embodiments have been described in detail to clearly illustrate the present invention, the present invention is not necessarily limited to a system including all of the components described in the embodiments. It is possible to replace some of the components of an embodiment with components of another embodiment. In addition, it is also possible to add, to the components of an embodiment, components of another embodiment. Further, it is also possible to, for some of the components of each embodiment, add, remove, or substitute components of another embodiment. Some or all of the foregoing components, functions, processing units, processing means, and the like may be implemented by hardware by being designed with an integrated circuit, for example. Alternatively, each of the foregoing components, functions, and the like may be implemented by software such that a processor analyzes and executes a program that implements each function. Information, such as the program that implements each function, tables, and files, may be stored in a recording device, such as a memory, a hard disk, or an SSD (Solid State Drive); or a recording medium, such as an IC card, an SD card, or a DVD.

REFERENCE SIGNS LIST

1 Portable terminal
2 On-board terminal
3 On-board terminal
4 Wireless base station
5 Control tower
10 Unmanned dump truck (autonomous vehicle)
20 Manned vehicle
30 Control center
31 Vehicle central control device
32 Emergency stop input device
33 Wired line
100 Travel path
101 Transmission/reception antenna
102 Wireless modem
103 Microcomputer device

104 External I/F device
105 Power supply device
106 Display device
107 Emergency stop button
108 GPS receiver
109 GPS antenna
121, 321, 421 Wireless communication layer (i.e., first wireless communication layer)
122, 322, 422 Secure communication layer (i.e., second communication layer)
123, 323, 423 Application layer (i.e., third communication layer)
200 Loading site
300 Dumping site
510 Wireless backhaul
801 CPU
802 Storage device
810 Battery
811 Voltage converter
820 VATT
1000 Vehicle control system

The invention claimed is:

1. A vehicle control system comprising:

an on-board terminal mounted on a vehicle, the on-board terminal including a plurality of wireless modems;

a plurality of wireless base stations that wirelessly communicate with the on-board terminal, and form a plurality of cells; and a vehicle central control device that communicates with the on-board terminal via one of the wireless base stations, wherein:

each of the plurality of wireless modems is configured to be able to, when the vehicle moves across the plurality of cells, execute a handover to switch a connection to one of the plurality of wireless base stations to another, each of the plurality of wireless modems is configured to be able to set threshold for executing the handover different from the others, when performing a handover, among the plurality of wireless base stations, from a first wireless base station to a second wireless base station, each of the plurality of wireless modems executes the handover by comparing a difference signal with the threshold, the difference signal indicating a difference between received power of a radio signal received from the first wireless base station and received power of a radio signal received from the second wireless base station, and a first wireless modem and a second wireless modem among the plurality of wireless modems are configured such that the threshold of the handover for the second wireless modem is larger than the threshold of the handover for the first wireless modem, such that the second wireless modem starts the handover delayed from the first wireless modem.

2. The vehicle control system according to claim 1, wherein the on-board terminal is configured to preferentially receive, of pieces of data received by the plurality of modems, data that has arrived earlier, and discard data that has arrived later.

3. The vehicle control system according to claim 1, wherein the threshold is determined in accordance with a speed of the vehicle or a weight of a load carried by the vehicle.

4. The vehicle control system according to claim 1, wherein:

the plurality of wireless modems are respectively con-
nected to transmission/reception antennas, and have
variable attenuators connected between the respective
wireless modems and the respective transmission/re-
ception antennas, and
each of the plurality of wireless modems is configured to
be able to set attenuation level of the variable attenuator
different from the others.

5. The vehicle control system according to claim 4,
wherein the on-board terminal is configured to preferentially
receive, of pieces of data received by the plurality of
wireless modems, data that has arrived earlier, and discard
data that has arrived later.

6. The vehicle control system according to claim 4,
wherein the attenuation level is determined in accordance
with a speed of the vehicle or a weight of a load carried by
the vehicle.

* * * * *